(12) United States Patent
Lou et al.

(10) Patent No.: US 12,341,639 B2
(45) Date of Patent: Jun. 24, 2025

(54) METHOD AND APPARATUS FOR MODULATION OF MILLIMETER WAVES AND PREAMBLE DESIGN

(71) Applicant: InterDigital Patent Holdings, Inc., Wilmington, DE (US)

(72) Inventors: Hanqing Lou, Syosset, NY (US); Rui Yang, Greenlawn, NY (US); Fengjun Xi, San Diego, CA (US); Nirav B Shah, San Diego, CA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 88 days.

(21) Appl. No.: 16/300,266

(22) PCT Filed: May 11, 2017

(86) PCT No.: PCT/US2017/032201
§ 371 (c)(1),
(2) Date: Nov. 9, 2018

(87) PCT Pub. No.: WO2017/200842
PCT Pub. Date: Nov. 23, 2017

(65) Prior Publication Data
US 2019/0150117 A1 May 16, 2019

Related U.S. Application Data

(60) Provisional application No. 62/365,286, filed on Jul. 21, 2016, provisional application No. 62/335,521, filed on May 12, 2016.

(51) Int. Cl.
*H04L 27/26* (2006.01)
*H04B 7/0452* (2017.01)
(Continued)

(52) U.S. Cl.
CPC ....... *H04L 27/2613* (2013.01); *H04B 7/0452* (2013.01); *H04L 5/0032* (2013.01);
(Continued)

(58) Field of Classification Search
CPC ... H04W 72/02; H04W 72/048; H04W 84/12; H04B 7/0452; H04L 5/0032;
(Continued)

(56) References Cited

U.S. PATENT DOCUMENTS 5,646,935 A    7/1997   Ishikawa et al.
6,807,145 B1 * 10/2004  Weerackody ........ H04B 7/0613
                                                    370/203

(Continued)

FOREIGN PATENT DOCUMENTS

CN    101421963 A    4/2009
CN    101909035 A    12/2010
(Continued)

OTHER PUBLICATIONS

"IEEE 802.11 TGay Use Cases", IEEE 802.11-2015/0625r2, May 2015, 21 pages.
(Continued)

*Primary Examiner* — Xuan Lu
(74) *Attorney, Agent, or Firm* — Majid Albassam

(57) ABSTRACT

Modulating millimeter waves may be embodied via a plurality of means. In at least one embodiment of the process disclosed herein, the process includes receiving, at a transmitter, a set of bits. The process also includes generating at least two complex-valued symbols based on the set of bits using a pipelined modulation at least in part by (i) mapping the set of bits to a first symbol using a first constellation mapping and (ii) mapping the set of bits to a second symbol using a second constellation mapping. The process also includes selecting a first data communication resource in a (Continued)

first single carrier channel for the first symbol and selecting a second data communication resource in a second single carrier channel for the second symbol. The process also includes transmitting, via the transmitter, the first and second symbols using the respective selected data communication resources.

16 Claims, 18 Drawing Sheets

(51) Int. Cl.
| | | |
|---|---|---|
| H04L 5/00 | (2006.01) | |
| H04L 27/34 | (2006.01) | |
| H04L 27/36 | (2006.01) | |
| H04W 72/02 | (2009.01) | |
| H04W 72/51 | (2023.01) | |
| H04W 84/12 | (2009.01) | |

(52) U.S. Cl.
CPC ............ *H04L 5/0044* (2013.01); *H04L 5/006* (2013.01); *H04L 27/3405* (2013.01); *H04W 72/02* (2013.01); *H04W 72/51* (2023.01); *H04L 5/0023* (2013.01); *H04L 27/2628* (2013.01); *H04L 27/2636* (2013.01); *H04W 84/12* (2013.01)

(58) Field of Classification Search
CPC . H04L 5/006; H04L 27/2613; H04L 27/3405; H04L 5/0023; H04L 27/2628; H04L 27/2636; H04L 5/0044
USPC .......................................................... 370/329
See application file for complete search history.

(56) References Cited

U.S. PATENT DOCUMENTS

| | | | |
|---|---|---|---|
| 6,892,341 B2 | 5/2005 | Golitschek et al. | |
| 7,653,141 B2 | 1/2010 | Mo et al. | |
| 8,165,185 B2 | 4/2012 | Zhang et al. | |
| 8,824,501 B2 | 9/2014 | Liu et al. | |
| 8,830,917 B1 | 9/2014 | Zhang et al. | |
| 8,891,592 B1 | 11/2014 | Zhang et al. | |
| 2002/0051431 A1* | 5/2002 | Choi ................. | H04W 36/0072 370/331 |
| 2003/0198282 A1* | 10/2003 | Tujkovic ................ | H04L 1/006 375/146 |
| 2005/0180353 A1 | 8/2005 | Hansen et al. | |
| 2007/0230594 A1* | 10/2007 | Mo .......................... | H04L 1/04 375/260 |
| 2008/0225965 A1* | 9/2008 | Pi .......................... | H04L 1/1867 375/260 |
| 2008/0267316 A1 | 10/2008 | Wengerter et al. | |
| 2009/0052576 A1* | 2/2009 | Golitschek Edler Von Elbwart et al. ......... | H04L 27/34 375/298 |
| 2009/0276672 A1 | 11/2009 | Lee et al. | |
| 2010/0232348 A1 | 9/2010 | Wu et al. | |
| 2011/0103341 A1* | 5/2011 | Ko ........................ | H04L 1/0625 370/329 |
| 2011/0268001 A1 | 11/2011 | Lee et al. | |
| 2012/0039298 A1 | 2/2012 | Lee et al. | |
| 2012/0224660 A1 | 9/2012 | Lee et al. | |
| 2013/0148592 A1* | 6/2013 | Noh ....................... | H04W 72/12 370/329 |
| 2013/0315342 A1* | 11/2013 | Um ..................... | H04L 27/2613 375/295 |
| 2013/0343311 A1* | 12/2013 | Tee ....................... | H04L 5/0094 370/329 |
| 2014/0153668 A1 | 6/2014 | Cai et al. | |
| 2014/0362781 A1* | 12/2014 | Yun ........................ | H04H 20/72 370/329 |
| 2015/0043407 A1* | 2/2015 | Wang .................... | H04W 80/02 370/311 |
| 2015/0128004 A1 | 5/2015 | Lee et al. | |
| 2015/0280876 A1* | 10/2015 | You ............................ | H04L 1/08 370/329 |
| 2015/0304076 A1* | 10/2015 | Lee ......................... | H04L 5/005 370/329 |
| 2016/0285663 A1* | 9/2016 | Choi ........................ | H04B 7/08 |
| 2016/0352552 A1* | 12/2016 | Liu ....................... | H04B 1/7176 |
| 2017/0195066 A1* | 7/2017 | Fine ..................... | H04B 14/004 |
| 2019/0150117 A1 | 5/2019 | Lou et al. | |

FOREIGN PATENT DOCUMENTS

| | | |
|---|---|---|
| CN | 102387105 A | 3/2012 |
| CN | 103973619 A | 8/2014 |
| CN | 104301071 A | 1/2015 |
| CN | 104980251 A | 10/2015 |
| CN | 105049095 A | 11/2015 |
| CN | 105071842 A | 11/2015 |
| CN | 105846880 A | 8/2016 |
| EP | 3455993 A2 | 3/2019 |
| JP | H07254915 A | 10/1995 |
| JP | 2003338852 A | 11/2003 |
| JP | 2009503959 A | 1/2009 |
| KR | 20100116550 A | 11/2010 |
| WO | WO-2007/117100 | 10/2007 |
| WO | WO 2010118781 A1 | 10/2010 |
| WO | WO 2015023150 A1 | 2/2015 |
| WO | WO 2017200842 A2 | 11/2017 |

OTHER PUBLICATIONS

"MAC and PHY Proposal for 802.11af", IEEE Standard 802.11-10/0258r0, Mar. 2010, 23 pages.
"Part 11: Wireless LAN Medium Access Control (MAC) and Physical Layer (PHY) Specifications", IEEE Standards Association; 802.11 ™-2012, Mar. 29, 2012, 2793 pages.
"Part 11: Wireless LAN Medium Access Control (MAC) and Physical Layer (PHY) Specifications—Amendment 2: Sub 1 GHz License Exempt Operation", Draft IEEE P802.11ah ™/D6.0, Feb. 2016, 645 pages.
"Part 11: Wireless LAN Medium Access Control (MAC) and Physical Layer (PHY) specifications—Amendment 5: TV White Spaces Operation", Draft IEEE P802.11af™/D2.0, Jul. 2012, 326 pages.
"Part 11: Wireless LAN Medium Access Control (MAC) and Physical Layer (PHY) Specifications—Amendment 7: Enhanced throughput for operation in license-exempt bands above 45 GHz", Draft IEEE P802.11ay™/D0.3, Mar. 2017, 226 pages.
"Part 11: Wireless LAN Medium Access Control (MAC) and Physical Layer (PHY) Specifications Amendment 3: Enhancements for Very High Throughput in the 60 GHz Band", IEEE Standards Association; 802.11ad™-2012, Dec. 28, 2012, 628 pages.
"Part 11: Wireless LAN Medium Access Control (MAC) and Physical Layer (PHY) specifications Amendment 5: Enhancements for Very High Throughput for Operation in Bands below 6 GHz", Draft IEEE P802.11ac™/D1.0, May 2011, 263 pages.
"Sub 1 GHz license-exempt PAR and 5C", IE802.11-10/0001r13, Jul. 2010, 7 pages.
Agilent Technologies, "Wireless LAN at 60 GHz—IEEE 802.11ad Explained", IEEE 802.11ad-2012 PHY, 2012, 28 pages.
Broadcom, "Constellation Mapping for EpoC LDPC Coding", Available at http://www.ieee802.org/3/bn/public/nov13/prodan_3bn_02_1113.pdf, Nov. 12-14, 2013, 14 pages.
Ericsson, "Signaling of UCI on PUSCH", 3GPP Tdoc R1-105329, 3GPP TSG-RAN WG1 #62bis, Xi'an, China, Oct. 11-16, 2010, 6 pages.
English-Language Abstract of Chinese Patent Publication No. CN 104301071 A, 2 pages.
English-Language Abstract of Chinese Patent Publication No. CN 104980251 A, 2 pages.
English-Language Abstract of Chinese Patent Publication No. CN 105071842 A, 2 pages.

(56) References Cited

OTHER PUBLICATIONS

Eitan, Alecsander (Qualcomm), "PHY Frame Format proposal for 11ay", IEEE 802.11-16/0061r0, IEEE, Jan. 18, 2016, 9 pages.
CN103973619A English Translation Feb. 26, 2024.
CN101909035A English Translation Feb. 26, 2024.
CN102387105A English Translation dated Feb. 26, 2024.
English Language Abstract, Chinese Publication No. 105049095A, published Nov. 11, 2015, 1 page.
English Language Abstract, Chinese Publication No. 105846880A, published Aug. 10, 2016, 1 page.

* cited by examiner

METHOD AND APPARATUS FOR MODULATION OF MILLIMETER WAVES AND PREAMBLE DESIGN

CROSS-REFERENCE TO RELATED APPLICATIONS

This application is a National Stage Application filed under 35 U.S.C. 371 of International Application No. PCT/US2017/032201, filed May 11, 2017 and claims benefit under 35 of U.S. Provisional Patent Applications: Ser. No. 62/335,521, filed May 12, 2016, entitled "SYSTEM AND METHOD FOR MODULATION AND PREAMBLE DESIGNS FOR MMW"; and Ser. No. 62/365,286, filed Jul. 21, 2016, entitled "SYSTEM AND METHOD FOR MODULATION AND PREAMBLE DESIGNS FOR MMW," both of which are incorporated herein by reference in their entirety.

BACKGROUND OF THE INVENTION

A wireless local area network (WLAN) in Infrastructure Basic Service Set (BSS) mode has an Access Point (AP/PCP) for the BSS and one or more stations (STAs) associated with the AP/PCP. The AP/PCP typically has access or an interface to a Distribution System (DS) or another type of wired/wireless network that carries traffic in and out of the BSS. Traffic to STAs that originates from outside the BSS arrives through the AP/PCP and is delivered to the STAs. Traffic originating from STAs to destinations outside the BSS is sent to the AP/PCP to be delivered to the respective destinations. Traffic between STAs within the BSS may also be sent through the AP/PCP where the source STA sends traffic to the AP/PCP and the AP/PCP delivers the traffic to the destination STA. Such traffic between STAs within a BSS is peer-to-peer traffic. Such peer-to-peer traffic may also be sent directly between the source and destination STAs with a direct link setup (DLS) using an 802.11e DLS or an 802.11z tunneled DLS (TDLS). A WLAN using an Independent BSS (IBSS) mode has no AP/PCP, and/or STAs, communicating directly with each other. This mode of communication is referred to as an "ad-hoc" mode of communication.

Using the 802.11ac infrastructure mode of operation, the AP/PCP may transmit a beacon on a fixed channel, usually the primary channel. This channel may be 20 MHz wide, and is the operating channel of the BSS. This channel is also used by the STAs to establish a connection with the AP/PCP. The fundamental channel access mechanism in an 802.11 system is Carrier Sense Multiple Access with Collision Avoidance (CSMA/CA). In this mode of operation, every STA, including the AP/PCP, will sense the primary channel. If the channel is detected to be busy, the STA backs off. Hence only one STA may transmit at any given time in a given BSS.

In 802.11n, High Throughput (HT) STAs may also use a 40 MHz wide channel for communication. This is achieved by combining the primary 20 MHz channel, with an adjacent 20 MHz channel to form a 40 MHz wide contiguous channel.

In 802.11ac, Very High Throughput (VHT) STAs may support 20 MHz, 40 MHz, 80 MHz, and 160 MHz wide channels. The 40 MHz, and 80 MHz, channels are formed by combining contiguous 20 MHz channels, similar to 802.11n described above. A 160 MHz channel may be formed either by combining 8 contiguous 20 MHz channels, or by combining two non-contiguous 80 MHz channels; this may also be referred to as an 80+80 configuration. For the 80+80 configuration, the data, after channel encoding, is passed through a segment parser that divides it into two streams. Inverse fast Fourier Transform (IFFT) and time domain processing are done on each stream separately. The streams are then mapped on to the two channels, and the data is transmitted. At the receiver, this mechanism is reversed, and the combined data is sent to the MAC.

Sub 1 GHz modes of operation are supported by 802.11af and 802.11ah. For these specifications the channel operating bandwidths, and carriers, are reduced relative to those used in 802.11n and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. A possible use case for 802.11ah is support for Meter Type Control (MTC) devices in a macro coverage area. MTC devices may have limited capabilities including only support for limited bandwidths, but also include a requirement for a very long battery life.

WLAN systems which support multiple channels, and channel widths, such as 802.11n, 802.11ac, 802.11af, and 802.11ah include a channel which is designated as the primary channel. The primary channel may have a bandwidth equal to the largest common operating bandwidth supported by all STAs in the BSS. The bandwidth of the primary channel is therefore limited by the particular STA, out of all STAs operating in a given BSS, which supports the smallest bandwidth operating mode. In the example of 802.11ah, the primary channel may be 1 MHz wide if there are STAs (e.g. MTC type devices) that only support a 1 MHz mode even if the AP/PCP, and other STAs in the BSS, may support a 2 MHz, 4 MHz, 8 MHz, 16 MHz, or other channel bandwidth operating modes. All carrier sensing, and NAV settings, depend on the status of the primary channel; i.e., if the primary channel is busy, for example, due to an STA supporting only a 1 MHz operating mode transmitting to the AP/PCP, then the entire available frequency bands are considered busy even though majority of them stay idle and available.

In the United States, the available frequency bands which may be used by 802.11ah are from 902 MHz to 928 MHz. In Korea they are from 917.5 MHz to 923.5 MHz; and in Japan, they are from 916.5 MHz to 927.5 MHz. The total bandwidth available for 802.11ah is 6 MHz to 26 MHz depending on the country code.

To improve spectral efficiency, 802.11ac has introduced the concept of downlink Multi-User MIMO (MU-MIMO) transmission to multiple STAs in the same symbol's time frame, e.g. during a downlink OFDM symbol. It is important to note that with MU-MIMO, as it is used in 802.11ac, interference of the waveform transmissions to multiple STAs is not an issue. However, all STAs involved in a MU-MIMO transmission with the AP/PCP must use the same channel or band and this limits the operating bandwidth to the smallest channel bandwidth that is supported by the STAs which are included in the MU-MIMO transmission with the AP/PCP.

SUMMARY

Systems and methods described herein are provided for millimeter wave transmission modulations, and preamble designs. Addressed herein are techniques for dual-pipelined modulation, a redesigned OFDM PPDU format, and a means for more reliable transmission of Control PHY in WLAN.

Task Group ay (TGay), approved by the IEEE in March 2015, is expected to develop an amendment that defines standardized modifications to both the IEEE 802.11 physical layers (PHY) and the IEEE 802.11 medium access control layer (MAC). The amendment hopes to enable at least one mode of operation capable of supporting a maximum throughput of at least 20 gigabits per second (measured at the MAC data service access point), while maintaining or improving the power efficiency per station. This amendment may also define operation parameters for license-exempt bands above 45 GHz while ensuring backward compatibility and coexistence with legacy directional multi-gigabit stations (defined by the IEEE 802.11ad-2012 amendment) operating in the same band.

Although much higher maximum throughput than that of 802.11ad is the primary goal of TGay, there are possibilities to include mobility and outdoor support. Since 802.11ay will operate in the same band as legacy standards, it is essential that new systems and methods ensure backward compatibility and coexistence with legacy standards in the same band.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1A:
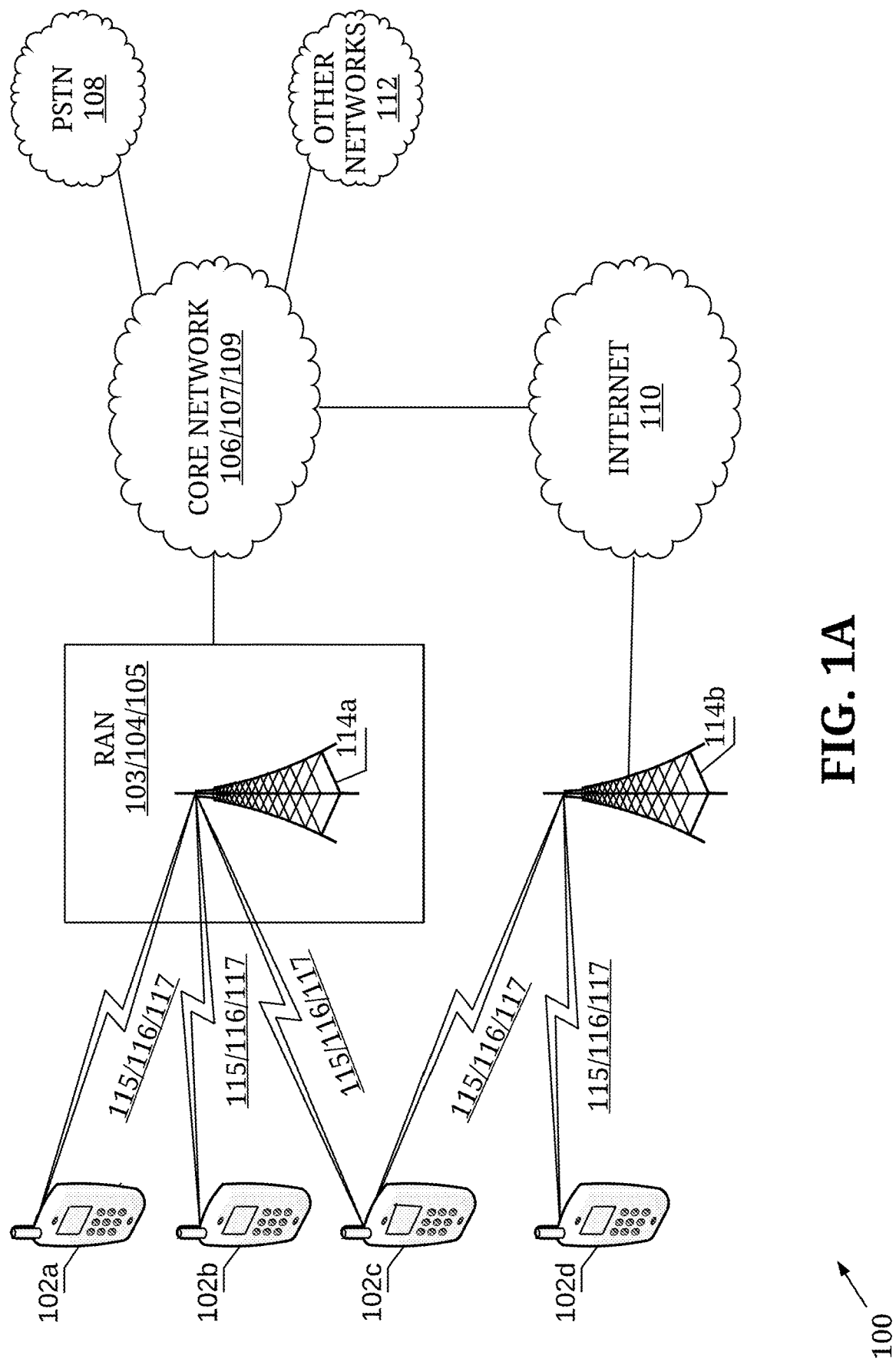
FIG. 1A depicts an example communications system in which one or more disclosed embodiments may be implemented.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Disclosed in the balance of this detailed description is a teaching of a modulation and preamble design for millimeter waves. At least one embodiment takes the form of a process that comprises receiving, at a transmitter, a set of bits. The process further comprises generating at least two complex-valued symbols based on the set of bits using a pipelined modulation at least in part by (i) mapping the set of bits to a first symbol using a first constellation mapping and (ii) mapping the set of bits to a second symbol using a second constellation mapping. The process further comprises selecting a first data communication resource in a first single carrier channel for the first symbol and selecting a second data communication resource in a second single carrier channel for the second symbol. The process further comprises transmitting, via the transmitter, the first and second symbols using the respective selected data communication resources.

In at least one embodiment, the first single carrier channel and the second single carrier channel have the same center frequency. As both channels are single carrier frequency channels (i.e., not channels that employ some form of frequency division multiplexing e.g., OFDM channels), it is necessary to have temporally and or spatially distinct communication channels. Otherwise, interference would prevent a receiver from being able to distinguish between the two symbols. The first data communication resource may be a first spatial stream of a MIMO transmission and the second data communication resource may be a second spatial stream of the MIMO transmission. Instead, or additionally, the second data communication resource may be temporally offset from the first data communication resource. In a further embodiment, the first single carrier channel and the second single carrier channel are channel bonded.

In a different embodiment, the first single carrier channel and the second single carrier channel have different center frequencies and together constitute a carrier-aggregated channel. Carrier aggregation is a technology to combine two or more carriers into one data channel to enhance the data capacity. It is possible to combine carriers in the same or different frequency bands. Carrier aggregation is often referred to as channel bonding in certain fields related to the present art. Like the previous example, the second data communication resource may be temporally offset from the first data communication resource.

In at least one embodiment, the first constellation mapping and the second constellation mapping are selected such that adjacent constellations point pairs in the first mapping are non-adjacent in the second mapping. This helps to improve the effectiveness of a maximum likelihood decoding scheme at a receiver as respective constellation point pairs will have uncommon neighbors.

In at least one embodiment, the first constellation mapping and the second constellation mapping each map the set of bits to different constellation signal points. That is to say the mappings each map the set of bits to different IQ values. A variety of means may be carried out to map the set of bits to different constellation signal points. In one example, a first constellation is a square constellation and a second constellation is a circular constellation. In another example, the constellation shapes are both square, however collocated constellation points map to different binary words. Of course, those with skill in the art would be able to list more examples as well, but the listing shall be left as it is for the sake of brevity and in no way by means of limitation.

In at least one embodiment, generating at least two complex-valued symbols using the pipelined modulation further comprises, performing at least one of (i) a bit-wise operation to the set of bits prior to mapping the set of bits to the second symbol and (ii) a symbol-wise operation performed on the first symbol to obtain the second symbol. In such an embodiment, if the two mappings are the same there will exist some diversity between the symbols. Therefore, the mapping of the set of bits to the second symbol may be carried out with a mapping that is the same as the first mapping or a mapping that is different from the first mapping. A bit-wise operation may be a reordering of the set of bits by using circular bit shifts. It could be a permutation applied to the set of bits to reorder the set of bits. Any selective bit flip scheme is valid. In at least one embodiment, the symbol wise operation is time-varying. Other examples of symbol-wise operations include a variety of manipulation of complex values in the IQ space such as rotations, reflections, distortions, and the like.

In some embodiments, mapping the set of bits to the second symbol using the second constellation mapping comprises at least modifying IQ values of the first symbol to generate the second symbol. In this manner, the second symbol may be generated immediately after the first symbol with a minor operation. Often it is preferred to minimize a maximum signal path duration. If both symbols are generated in parallel it would require greater physical hardware resources to accommodate a widened data pathway. Alternatively, if the second symbol is generated from the first, an execution time may slightly increase, however circuit elements are responsibly reused and costs are reduced.

In one embodiment, at least one of the first constellation mapping and the second constellation mapping is a square 64-QAM constellation mapping.

In a plurality of different and related embodiments, allocating the second data communication resource for the second symbol is carried out according to a function that is based on parameters of the first data communication resource. In at least one such embodiment, the transmitter uses a signaling field to indicate the predefined function and the parameters. In another embodiment, the predefined function is based on a chip index of the first data communication resource and allocates a chip index for the second data communication resource that is separated by a coherence time from the first data communication resource. In another embodiment, the predefined function is based on a spatial sample stream index of the first data communication resource. In another embodiment, the predefined function is based on a spatial time stream index of the first data communication resource. In another embodiment, the predefined function is based on a processing-time difference between a first signal processing path that corresponds with the first symbol and a second signal processing path that corresponds with the second symbol.

In at least one embodiment, the transmitter uses a signaling field in a PLCP header to indicate use of pipelined modulation.

In at least one embodiment, the method further comprises interleaving the first symbol and the second symbol prior to selecting the first and second data communication resources. In this manner, the in-phase data of the first symbol can become the quadrature data of the second symbol and the quadrature data of the second symbol can become the in-phase data of the first symbol. The quadrature data of the first symbol can become the in-phase data of the second symbol and the in-phase data of the second symbol can become the quadrature data of the first symbol as well. Optionally, in case of two modulated symbols do not have the same in-phase (I) and quadrature-phase (Q) component, I/Q component-wise interleaving may be applied to them. Then the two newly constructed modulated symbols may be sent over two different resources which could be two different time, frequency, or spatial resources. By doing so, I and Q components of the transmitted symbol may experience independent fading. At a receiver, after I/Q component-wise de-interleaving, the two modulated symbols may be detected by maximum likelihood (ML) criterion.

At least one embodiment of the system and process disclosed herein takes the form of an apparatus that comprises an input, configured to receive a set of bits. The apparatus further comprises, a pipelined constellation point generator, configured to generate complex baseband symbols from the set of bits at least in part by (i) mapping the set of bits to a first symbol using a first constellation mapping and by (ii) mapping the set of bits to a second symbol using a second constellation mapping. The apparatus further comprises, a data communication resource selector, configured to select a first data communication resource in a first single carrier channel for the first symbol and a second data communication resource in a second single carrier channel for the second symbol. The apparatus further comprises a transmitter, having a modulator, configured to transmit the first and second symbols using the respective selected data communication resources.

At least one embodiment of the system and process disclosed herein takes the form of a method that comprises receiving at a transmitter a set of $(2n+1)*2$ bits, wherein n can be a positive integer. The method further comprises processing the set of bits in a first signal processing path wherein the processing comprises a conventional even-ordered modulation scheme and allocation to a frequency subcarrier and a spatial resource unit to generate a first mapped symbol mapped to a first constellation point in a complex domain. The method further comprises processing the set of bits in a second signal processing path, wherein the processing comprises (i) reordering the set of bits according to a predefined scheme to generate a reordered set of bits, (ii) modulating the reordered set of bits using an even-ordered modulation scheme to generate a second modulated set of bits, (iii) mapping the second modulated set of bits as a second mapped symbol to a second constellation point in the complex domain, and (iv) allocating the second mapped symbol to a time-frequency-spatial resource based on a predefined function. The method further comprises outputting from the transmitter the first and second and second mapped symbols.

In at least one such embodiment, the predefined function includes a factor for a time difference between the allocation of the first and second mapped symbols.

In at least one such embodiment, the predefined function is predefined for a single transmission.

In at least one such embodiment, the predefined function is specified in a standard.

In at least one such embodiment, the predefined function is a function of at least one of time, frequency, and spatial stream.

In at least one such embodiment, the predefined function is configured to separate the first and second mapped symbols by coherence bandwidth.

In at least one such embodiment, the predefined function is configured to separate the first and second mapped symbols by coherence time.

In at least one such embodiment, the predefined function is configured to separate the first and second mapped symbols by spatial stream index or spatial time stream index.

In at least one such embodiment, the method further comprises outputting from the transmitter a signal that pipelined modulation is being used as a modulation mode of the transmitter.

In at least one such embodiment, the method further comprises outputting from the transmitter a signal that the transmitter is capable of performing pipelined modulation.

In at least one such embodiment, n comprises a positive integer greater than or equal to zero.

In at least one such embodiment, the method further comprises applying I/Q component-wise interleaving to the first and second modulated symbols, such that a Q or I component of the first modulated symbol is swapped with an I or Q component respectively of the second modulated symbol.

At least one embodiment of the system and process disclosed herein takes the form of an system that comprises a processor and a non-transitory storage medium storing instructions operative, when executed on the processor, to perform functions including receiving at a transmitter a set of $(2n+1)*2$ bits. The functions further include processing the set of bits in a first signal processing path, wherein the processing comprises a conventional even-ordered modulation scheme and allocation to a frequency subcarrier and a spatial resource unit to generate a first mapped symbol mapped to a first constellation point in a complex domain.

The functions further include processing the set of bits in a second signal processing path, wherein the processing comprises (i) reordering the set of bits according to a predefined scheme to generate a reordered set of bits, (ii) modulating the reordered set of bits using an even-ordered modulation scheme to generate a second modulated set of bits, (iii) mapping the second modulated set of bits as a second mapped symbol to a second constellation point in the complex domain, and (iv) allocating the second mapped symbol to a time-frequency-spatial resource based on a predefined function. The functions further include outputting from the transmitter the first and second and second mapped symbols.

In one such embodiment, the instructions are further operative to apply I/Q component-wise interleaving to the first and second modulated symbols, such that a Q or I component of the first modulated symbol is swapped with an I or Q component respectively of the second modulated symbol.

Another embodiment of the system and process disclosed herein takes the form of a method comprising transmitting a PPDU, wherein the PPDU comprises at least two parts. The first part comprises a legacy STF (L-SFT), a legacy CE field (L-CE), a legacy Header (L-Header), and an EDMG Header A, and wherein the first part is modulated using SC modulation. The second part comprises an EDMG STF for OFDM (EDMG-O-STF), an EDMG CEF for OFDM (EDMG-O-CE), an EDMA Header B (EDMG Header-B), and a data file, and wherein the second part is modulated using OFDM modulation.

In one such embodiment, at least one of the L-Header or EDMG-Header-A comprises signal indicating if the current PPDU is OFDM or SC, and the duration of the rest of the PPDU.

In one such embodiment, the OFDM field has its own CEF transmitted with the OFDM waveform.

In one such embodiment, a receiver need not use the channel estimation form the legacy SC part.

In one such embodiment, the structure of the transmitted PPDU supports at least one of single user MIMO, multi-user MIMO, channel bonding, and channel aggregation.

Another embodiment of the system and process disclosed herein takes the form of a Control PHY PPDU encoder comprising (i) a scrambler module, (ii) an LDPC encoder module, (iii) a differential encoder module, (iv) a spreading module, (v) an interleaver module configured to distribute spread bits and compensate for burst type errors, and (vi) a modulation module.

In some embodiment of the encoder the modulation module is configured for $\pi/2$-BPSK modulation. In some embodiments of the encoder, the spreading module is configured for 32× spreading.

Moreover, any of the embodiments, variations, and permutations described in the preceding paragraphs and anywhere else in this disclosure can be implemented with respect to any embodiments, including with respect to any method embodiments and with respect to any system embodiments.

Before proceeding with this detailed description, it is noted that the entities, connections, arrangements, and the like that are depicted in—and described in connection with—the various figures are presented by way of example and not by way of limitation. As such, any and all statements or other indications as to what a particular figure "depicts," what a particular element or entity in a particular figure "is" or "has," and any and all similar statements—that may in isolation and out of context be read as absolute and therefore limiting—can only properly be read as being constructively preceded by a clause such as "In at least one embodiment, . . . ." And it is for reasons akin to brevity and clarity of presentation that this implied leading clause is not repeated ad nauseum in this detailed description.

The systems and methods disclosed herein may be used with the wireless communication systems described with respect to FIGS. 1A-1F. As an initial matter, these wireless systems will be described. FIG. 1A is a diagram of an example communications system 100 in which one or more disclosed embodiments may be implemented. The communications system 100 may be a multiple access system that provides content, such as voice, data, video, messaging, broadcast, and the like, to multiple wireless users. The communications system 100 may enable multiple wireless users to access such content through the sharing of system resources, including wireless bandwidth. For example, the communications systems 100 may employ one or more channel-access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include WTRUs 102a, 102b, 102c, and/or 102d (which generally or collectively may be referred to as WTRU 102), a RAN 103/104/105, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106/107/109, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, and the like. The base station 114a and/or the base station 114b may be configured to transmit and/or receive wireless signals within a particular geographic region, which may be referred to as a cell (not shown). The cell may further be divided into sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 115/116/117, which may be any suitable wireless communication link (e.g., radio frequency (RF), microwave, infrared (IR), ultraviolet (UV), visible light, and the like). The air interface 115/116/117 may be established using any suitable radio access technology (RAT).

More specifically, as noted above, the communications system 100 may be a multiple access system and may employ one or more channel-access schemes, such as CDMA, TDMA, FDMA, OFDMA, SC-FDMA, and the like. For example, the base station 114a in the RAN 103/104/105 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E UTRA), which may establish the air interface 115/116/117 using Long Term Evolution (LTE) and/or LTE Advanced (LTE A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS 2000), Interim Standard 95 (IS 95), Interim Standard 856 (IS 856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, as examples, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, and the like) to establish a picocell or femtocell. As shown in FIG. 1A, the base station 114b may have a direct connection to the Internet 110. Thus, the base station 114b may not be required to access the Internet 110 via the core network 106/107/109.

The RAN 103/104/105 may be in communication with the core network 106/107/109, which may be any type of network configured to provide voice, data, applications, and/or voice over internet protocol (VoW) services to one or more of the WTRUs 102a, 102b, 102c, 102d. As examples, the core network 106/107/109 may provide call control, billing services, mobile location-based services, pre-paid calling, Internet connectivity, video distribution, and the like, and/or perform high-level security functions, such as user authentication. Although not shown in FIG. 1A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and IP in the TCP/IP Internet protocol suite. The networks 112 may include wired and/or wireless communications networks owned and/or operated by other service providers. For example, the networks 112 may include another core network connected to one or more RANs, which may employ the same RAT as the RAN 103/104/105 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
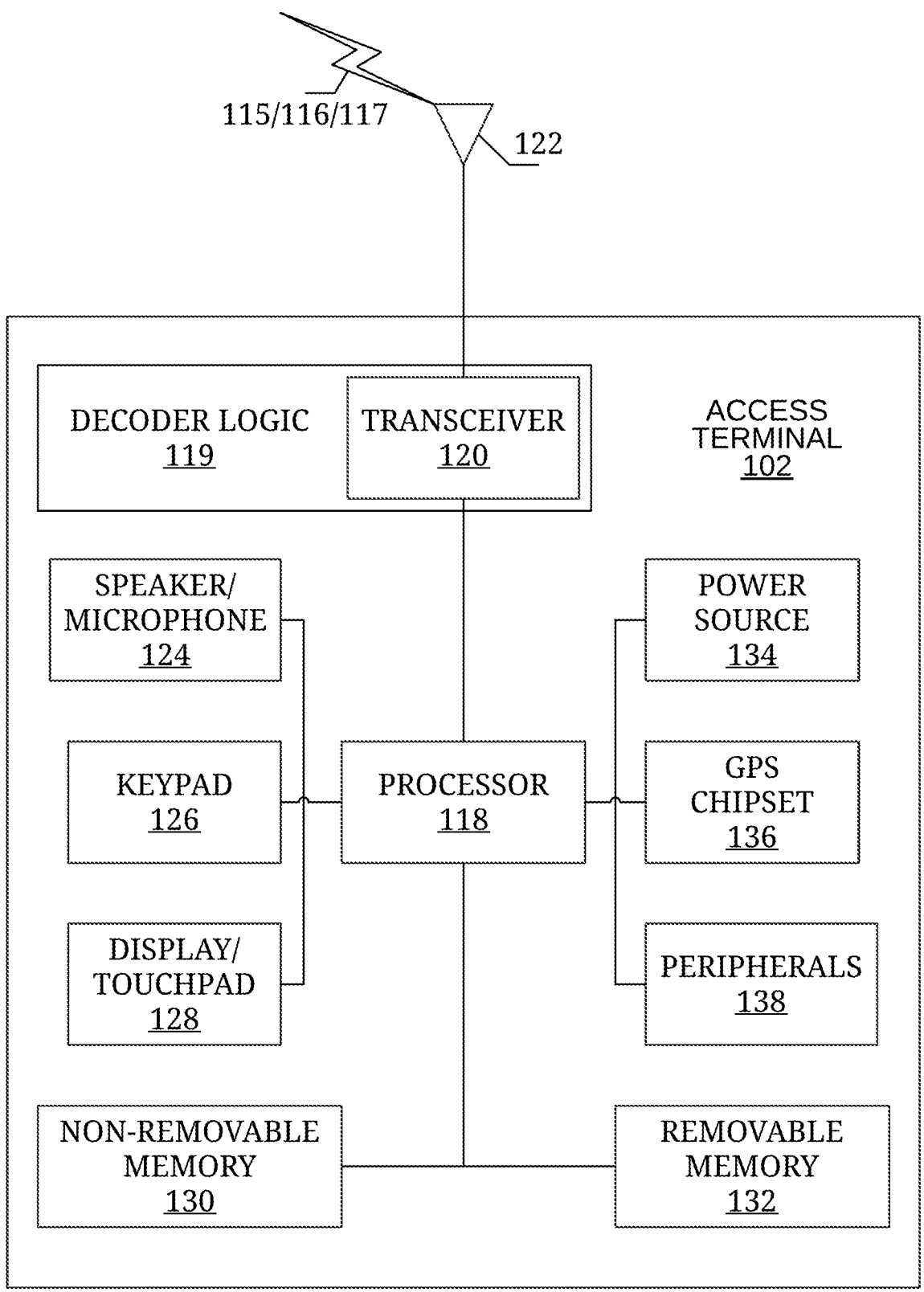
FIG. 1B depicts an example wireless transmit/receive unit (WTRU) that may be used within the communications system of FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, a non-removable memory 130, a removable memory 132, a power source 134, a global positioning system (GPS) chipset 136, and other peripherals 138. The transceiver 120 may be implemented as a component of decoder logic 119. For example, the transceiver 120 and decoder logic 119 can be implemented on a single LTE or LTE-A chip. The decoder logic may include a processor operative to perform instructions stored in a non-transitory computer-readable medium. As an alternative, or in addition, the decoder logic may be implemented using custom and/or programmable digital logic circuitry.

It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 1B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, as examples. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, as examples.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. As examples, the power source 134 may include one or more dry cell batteries (e.g., nickel-cadmium (NiCd), nickel-zinc (NiZn), nickel metal hydride (NiMH), lithium-ion (Li-ion), and the like), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
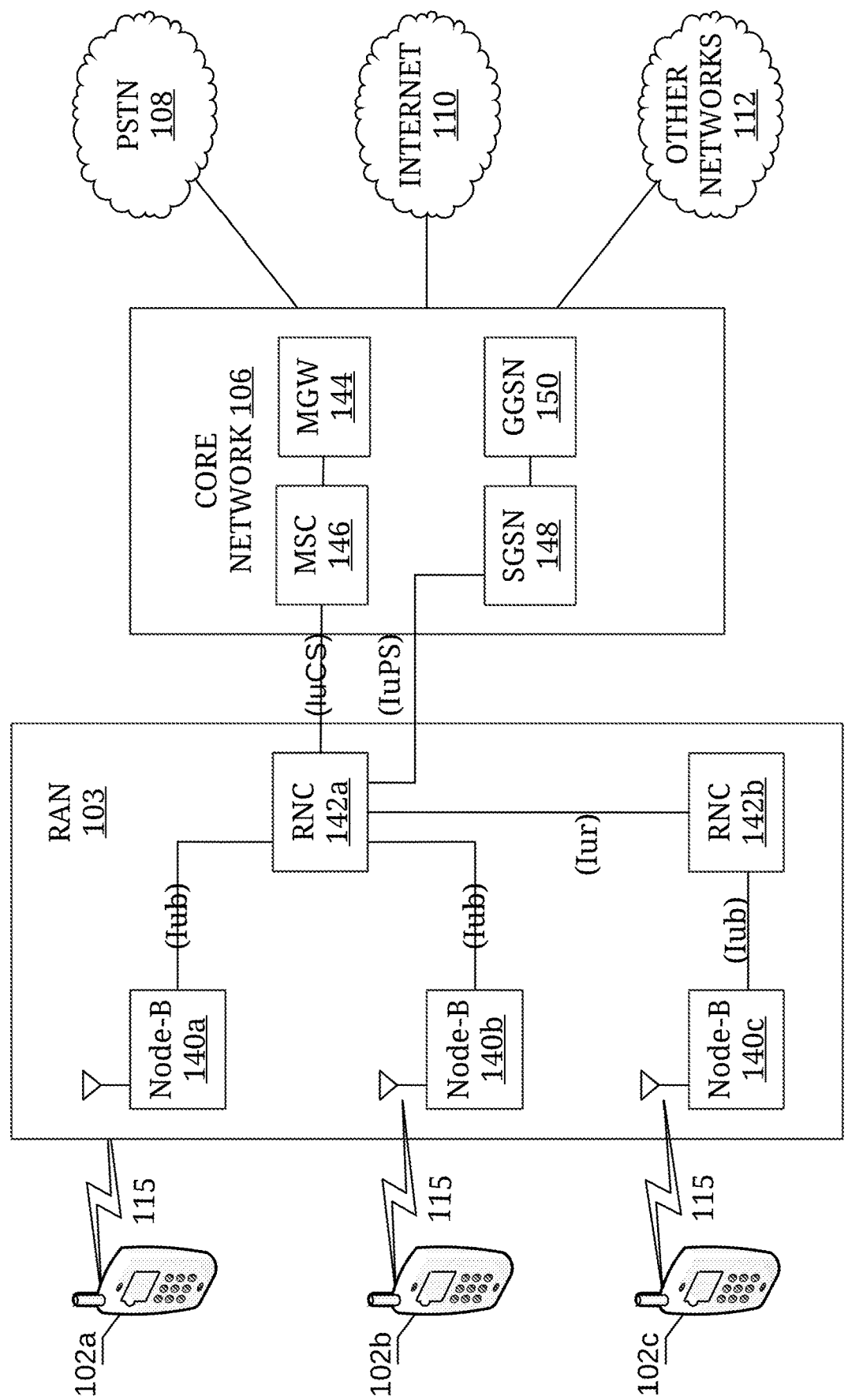
FIG. 1C depicts an example radio access network (RAN) and an example core network that may be used within the communications system of FIG. 1A.

FIG. 1C is a system diagram of the RAN 103 and the core network 106 according to an embodiment. As noted above, the RAN 103 may employ a UTRA radio technology to communicate with the WTRUs 102a, 102b, 102c over the air interface 115. The RAN 103 may also be in communication with the core network 106. As shown in FIG. 1C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer-loop power control, load control, admission control, packet scheduling, handover control, macrodiversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional landline communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between the WTRUs 102a, 102b, 102c and IP-enabled devices.

As noted above, the core network 106 may also be connected to the networks 112, which may include other wired and/or wireless networks that are owned and/or operated by other service providers.

Figure 1D:
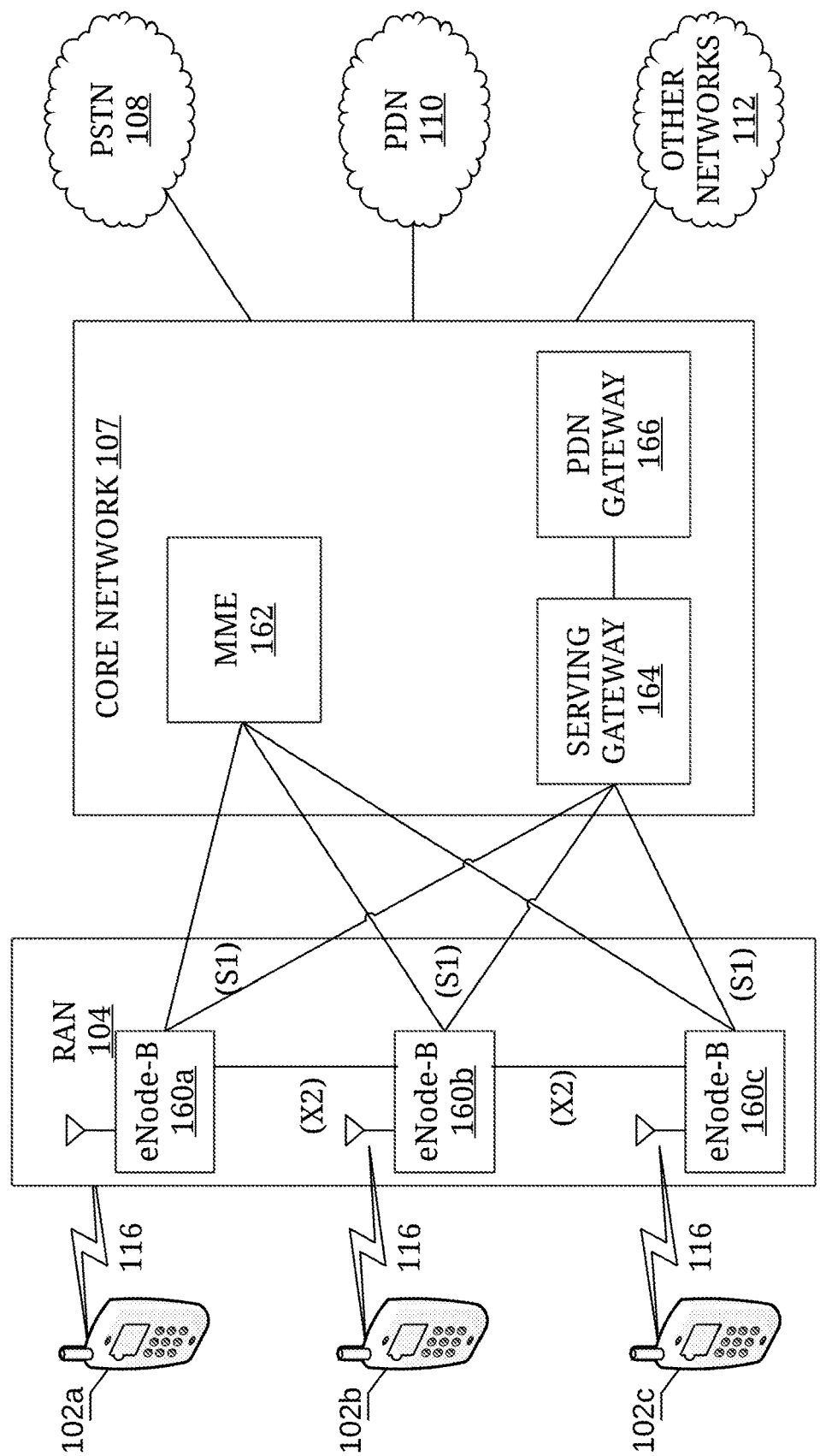
FIG. 1D depicts a second example RAN and a second example core network that may be used within the communications system of FIG. 1A.

FIG. 1D is a system diagram of the RAN 104 and the core network 107 according to an embodiment. As noted above, the RAN 104 may employ an E-UTRA radio technology to communicate with the WTRUs 102a, 102b, 102c over the air interface 116. The RAN 104 may also be in communication with the core network 107.

The RAN 104 may include eNode Bs 160a, 160b, 160c, though it will be appreciated that the RAN 104 may include any number of eNode Bs while remaining consistent with an embodiment. The eNode Bs 160a, 160b, 160c may each include one or more transceivers for communicating with the WTRUs 102a, 102b, 102c over the air interface 116. In one embodiment, the eNode Bs 160a, 160b, 160c may implement MIMO technology. Thus, the eNode B 160a, for example, may use multiple antennas to transmit wireless signals to, and receive wireless signals from, the WTRU 102a.

Each of the eNode Bs 160a, 160b, 160c may be associated with a particular cell (not shown) and may be configured to handle radio-resource-management decisions, handover decisions, scheduling of users in the uplink and/or downlink, and the like. As shown in FIG. 1D, the eNode Bs 160a, 160b, 160c may communicate with one another over an X2 interface.

The core network 107 shown in FIG. 1D may include a mobility management entity (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode Bs 160a, 160b, 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional landline communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired and/or wireless networks that are owned and/or operated by other service providers.

Figure 1E:
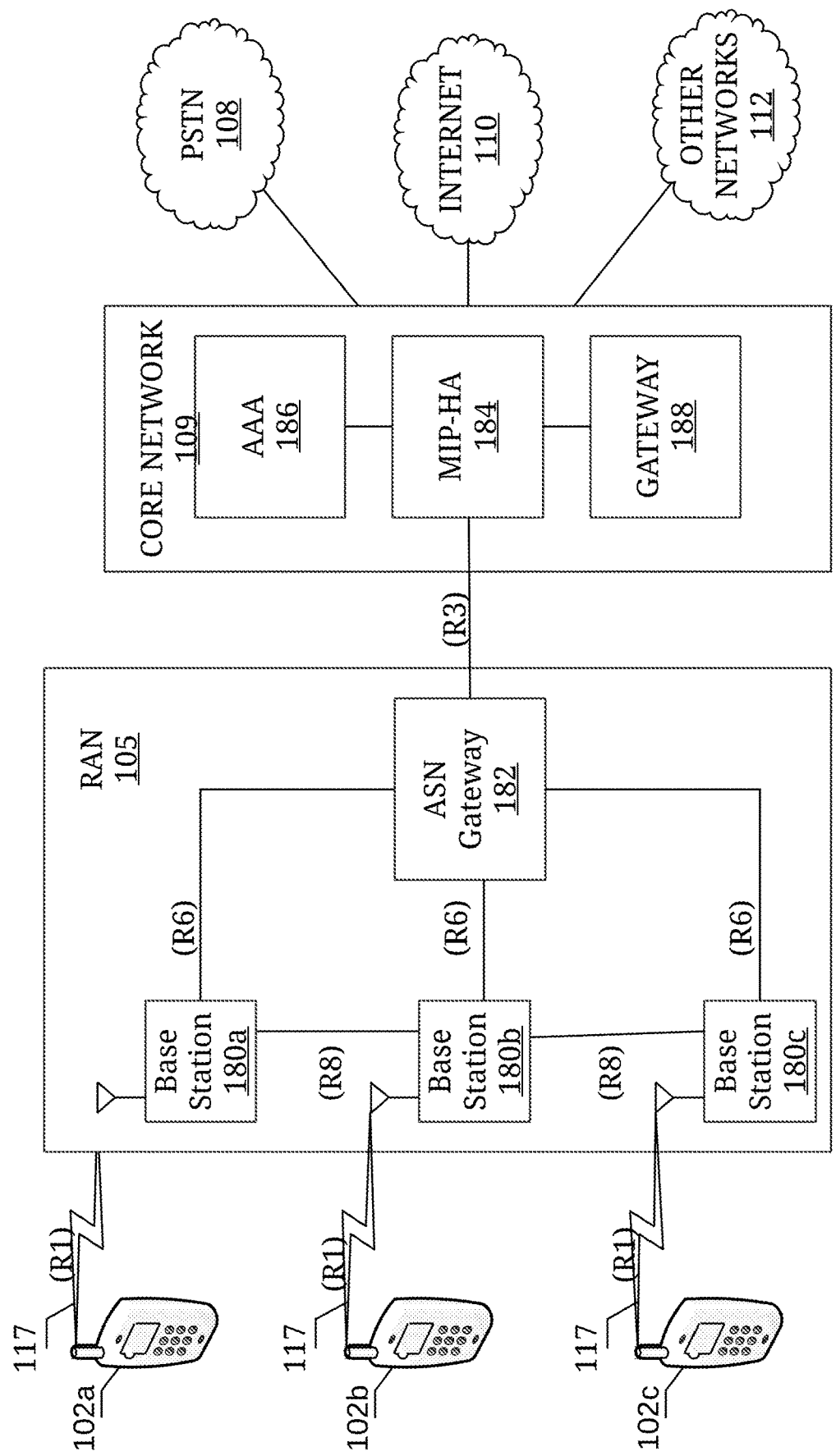
FIG. 1E depicts a third example RAN and a third example core network that may be used within the communications system of FIG. 1A.

FIG. 1E is a system diagram of the RAN 105 and the core network 109 according to an embodiment. The RAN 105 may be an access service network (ASN) that employs IEEE 802.16 radio technology to communicate with the WTRUs 102a, 102b, 102c over the air interface 117. As will be further discussed below, the communication links between the different functional entities of the WTRUs 102a, 102b, 102c, the RAN 105, and the core network 109 may be defined as reference points.

As shown in FIG. 1E, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell (not shown) in the RAN 105 and may each include one or more transceivers for communicating with the WTRUs 102a, 102b, 102c over the air interface 117. In one embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility-management functions, such as handoff triggering, tunnel establishment, radio-resource management, traffic classification, quality-of-service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, 102c may establish a logical interface (not shown) with the core network 109. The logical interface between the WTRUs 102a, 102b, 102c and the core network 109 may be defined as an R2 reference point (not shown), which may be used for authentication, authorization, IP-host-configuration management, and/or mobility management.

The communication link between each of the base stations 180a, 180b, 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 1E, the RAN 105 may be connected to the core network 109. The communication link between the RAN 105 and the core network 109 may defined as an R3 reference point that includes protocols for facilitating data transfer and mobility-management capabilities, as examples. The core network 109 may include a mobile-IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MW-HA 184 may be responsible for IP-address management, and may enable the WTRUs 102a, 102b, 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional landline communications devices. In addition, the gateway 188 may provide the WTRUs 102a, 102b, 102c with access to the networks 112, which may include other wired and/or wireless networks that are owned and/or operated by other service providers.

Although not shown in FIG. 1E, it will be appreciated that the RAN 105 may be connected to other ASNs and the core network 109 may be connected to other core networks. The communication link between the RAN 105 the other ASNs may be defined as an R4 reference point (not shown), which may include protocols for coordinating the mobility of the WTRUs 102a, 102b, 102c between the RAN 105 and the other ASNs. The communication link between the core network 109 and the other core networks may be defined as an R5 reference point (not shown), which may include protocols for facilitating interworking between home core networks and visited core networks.

Figure 1F:
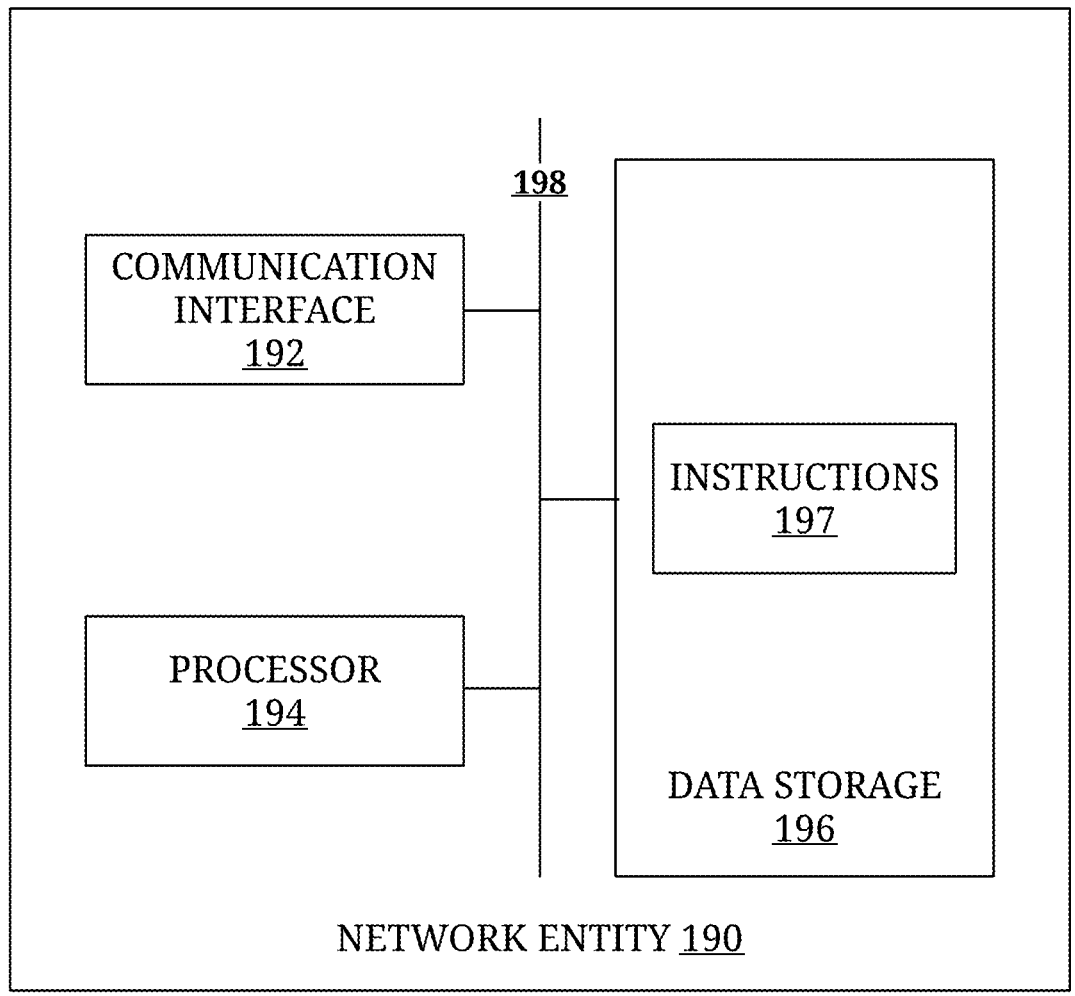
FIG. 1F depicts an exemplary network entity that may be used within the communication system of FIG. 1A.

FIG. 1F depicts an example network entity 190 that may be used within the communication system 100 of FIG. 1A. As depicted in FIG. 1F, network entity 190 includes a communication interface 192, a processor 194, and non-transitory data storage 196, all of which are communicatively linked by a bus, network, or other communication path 198.

Communication interface 192 may include one or more wired communication interfaces and/or one or more wireless-communication interfaces. With respect to wired communication, communication interface 192 may include one or more interfaces such as Ethernet interfaces, as an example. With respect to wireless communication, communication interface 192 may include components such as one or more antennae, one or more transceivers/chipsets designed and configured for one or more types of wireless (e.g., LTE) communication, and/or any other components deemed suitable by those of skill in the relevant art. And further with respect to wireless communication, communication interface 192 may be equipped at a scale and with a configuration appropriate for acting on the network side—as opposed to the client side—of wireless communications (e.g., LTE communications, Wi Fi communications, and the like). Thus, communication interface 192 may include the appropriate equipment and circuitry (perhaps including multiple transceivers) for serving multiple mobile stations, UEs, or other access terminals in a coverage area.

Processor 194 may include one or more processors of any type deemed suitable by those of skill in the relevant art, some examples including a general-purpose microprocessor and a dedicated DSP.

Data storage 196 may take the form of any non-transitory computer-readable medium or combination of such media, some examples including flash memory, read-only memory (ROM), and random-access memory (RAM) to name but a few, as any one or more types of non-transitory data storage deemed suitable by those of skill in the relevant art could be used. As depicted in FIG. 1F, data storage 196 contains program instructions 197 executable by processor 194 for carrying out various combinations of the various network-entity functions described herein.

In some embodiments, the network-entity functions described herein are carried out by a network entity having a structure similar to that of network entity 190 of FIG. 1F. In some embodiments, one or more of such functions are carried out by a set of multiple network entities in combination, where each network entity has a structure similar to that of network entity 190 of FIG. 1F. In various different embodiments, network entity 190 is—or at least includes—one or more of (one or more entities in) RAN 103, (one or more entities in) RAN 104, (one or more entities in) RAN 105, (one or more entities in) core network 106, (one or more entities in) core network 107, (one or more entities in) core network 109, base station 114*a*, base station 114*b*, Node B 140*a*, Node B 140*b*, Node B 140*c*, RNC 142*a*, RNC 142*b*, MGW 144, MSC 146, SGSN 148, GGSN 150, eNode B 160*a*, eNode B 160*b*, eNode B 160*c*, MME 162, serving gateway 164, PDN gateway 166, base station 180*a*, base station 180*b*, base station 180*c*, ASN gateway 182, MIP HA 184, AAA 186, and gateway 188. And certainly, other network entities and/or combinations of network entities could be used in various embodiments for carrying out the network-entity functions described herein, as the foregoing list is provided by way of example and not by way of limitation.

Note that various hardware elements of one or more of the described embodiments are referred to as "modules" that carry out (i.e., perform, execute, and the like) various functions that are described herein in connection with the respective modules. As used herein, a module includes hardware (e.g., one or more processors, one or more microprocessors, one or more microcontrollers, one or more microchips, one or more application-specific integrated circuits (ASICs), one or more field programmable gate arrays (FPGAs), one or more memory devices) deemed suitable by those of skill in the relevant art for a given implementation. Each described module may also include instructions executable for carrying out the one or more functions described as being carried out by the respective module, and it is noted that those instructions could take the form of or include hardware (i.e., hardwired) instructions, firmware instructions, software instructions, and/or the like, and may be stored in any suitable non-transitory computer-readable medium or media, such as commonly referred to as RAM, ROM, etc.

Figure 2:
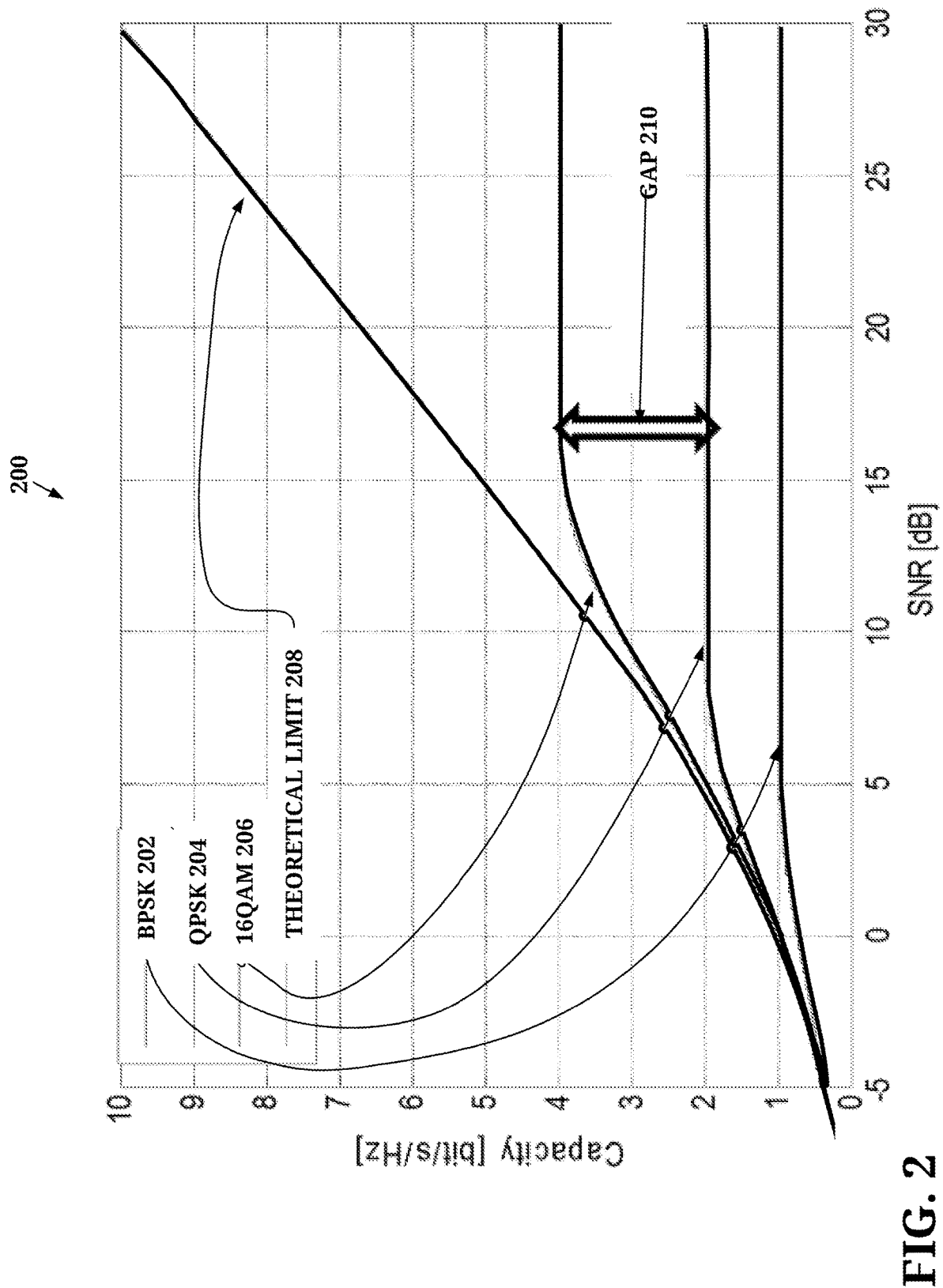
FIG. 2 depicts exemplary capacity limits for different modulation schemas
Figure 3:
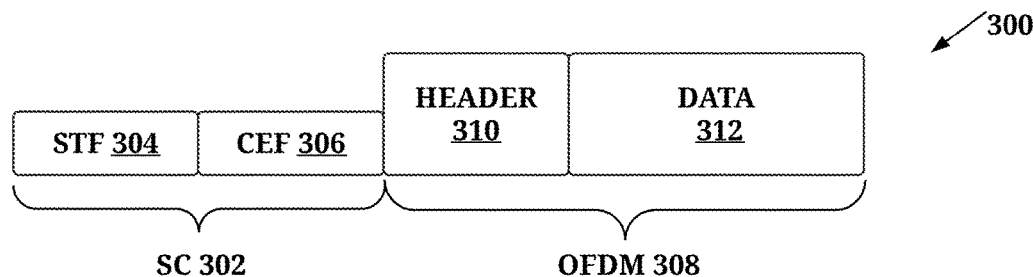
FIG. 3 depicts an exemplary OFDM PPDU format, in accordance with at least one embodiment.

The following description of FIGS. 2-3 are provided to help guide a discussion on problems which helped to motivate the present systems and methods.

Gray mapping is used widely for $2^{2n}$-QAM modulation. For example, many communication systems utilize 4-QAM, 16-QAM and 64-QAM. However, odd constellations ($2^{2n+1}$-QAM modulation) are rarely utilized, for example 8-QAM. This is due to the Gray code penalty which results when constellations points are not favorably distributed.

FIG. 2 depicts a capacity vs SNR graph, in accordance with at least one embodiment. In particular FIG. 2 depicts a plot 200 having a BPSK 202, a QPSK 204, a 16QAM 206, a theoretical limit 208, and a gap 210. The expected capacity for k-QAM modulations (k=2, 4, 16) are shown in FIG. 2. Note that there is a significant capacity gap, gap 210, between QPSK 204 and 16QAM 206. STAs with SNR good enough to support QPSK 204 but insufficient for 16QAM 206 must utilize QPSK 204 modulation. Thus, the system efficiency for STAs in that SNR range is not ideal. Similarly, a gap exists between 16QAM and 64QAM (not shown), and would affect stations having an SNR sufficient for 16QAM but not high enough for 64QAM.

FIG. 3 depicts an exemplary OFDM PPDU format, in accordance with at least one embodiment. The OFDM PPDU format is from 802.11. 802.11ad OFDM PHY is not included in a future 802.11 standard due to compatibility issues. Moreover, with current 802.11ad OFDM PPDU formats, an STF 304 and a CEF 306 are single carrier modulated (SC 302) while a Header 310 and a Data 312 fields are employing OFDM waveforms. The SC 302 and the OFDM 308 waveforms have different sampling rates which demands up-sampling and filtering for the OFDM 308 waveform. A 3/2 resampling in a specified filter, hFilt, is applied at a receiver of the OFDM 308. Thus, the filter is typically specified at a transmitter side and is known at the receiver side so that the receiver can compensate for a channel estimation result obtained based on the SC 302 and the CEF 306 and apply it to the Header 310 and the Data 312. Due to the abovementioned complications, an OFDM PPDU format is better to be redesigned.

Control PHY is defined in 802.11ad as the lowest data rate transmission. Frames which must be transmitted before beamforming training may use a Control PHY PPDU. Thus, improving a reliability of the Control PHY transmission, especially in low SNR ranges, is needed.

Descriptions of methods and systems are provided in the following sections to address at least the issues mentioned in the paragraphs above.

Figure 4:
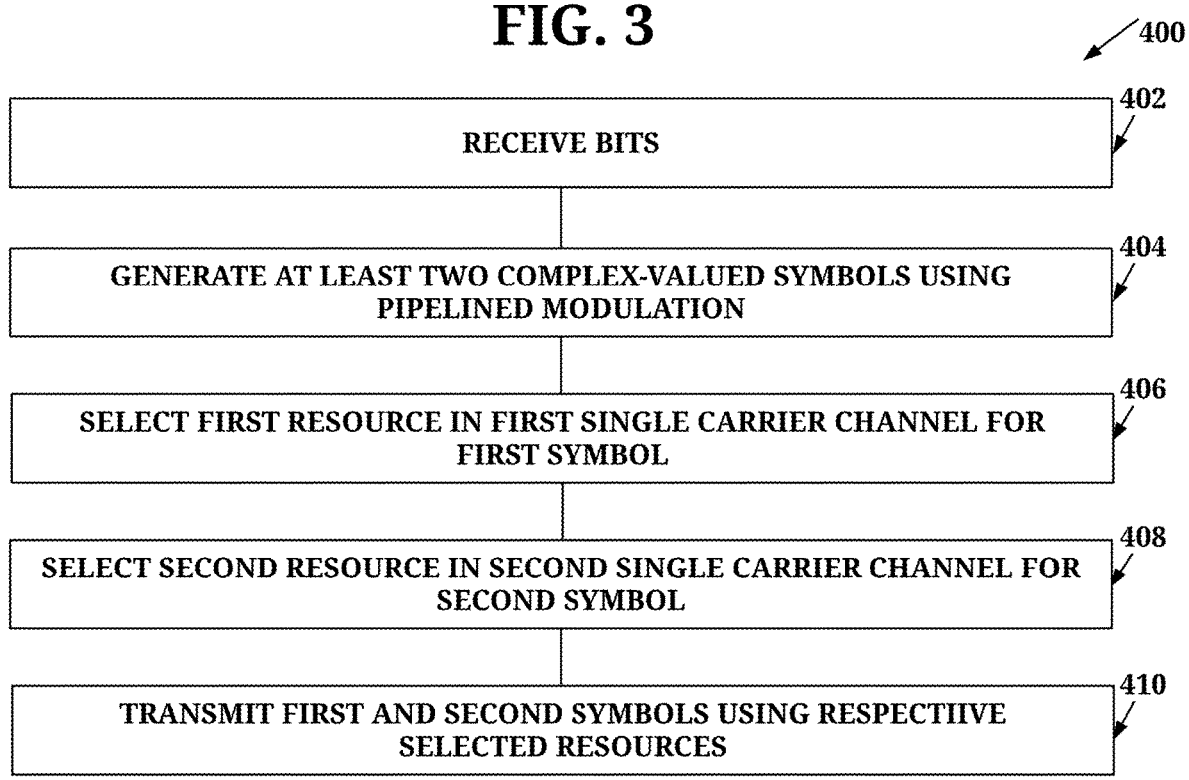
FIG. 4 depicts an exemplary process flow chart, in accordance with at least one embodiment.

FIG. 4 depicts an exemplary process flow chart, in accordance with at least one embodiment. FIG. 4 depicts a process 400 that includes elements 402-410. Element 402 comprises receiving, at a transmitter, a set of bits. Element 404 comprises generating at least two complex-valued symbols based on the set of bits using a pipelined modulation at least in part by (i) mapping the set of bits to a first symbol using a first constellation mapping and (ii) mapping the set of bits to a second symbol using a second constellation mapping. Element 408 comprises selecting a first data communication resource in a first single carrier channel for the first symbol and selecting a second data communication resource in a second single carrier channel for the second symbol. Element 410 comprises transmitting, via the transmitter, the first and second symbols using the respective selected data communication resources. Of course, any of the embodiments discussed throughout the present disclosure may be applied within the context of the process 400.

Figure 5:
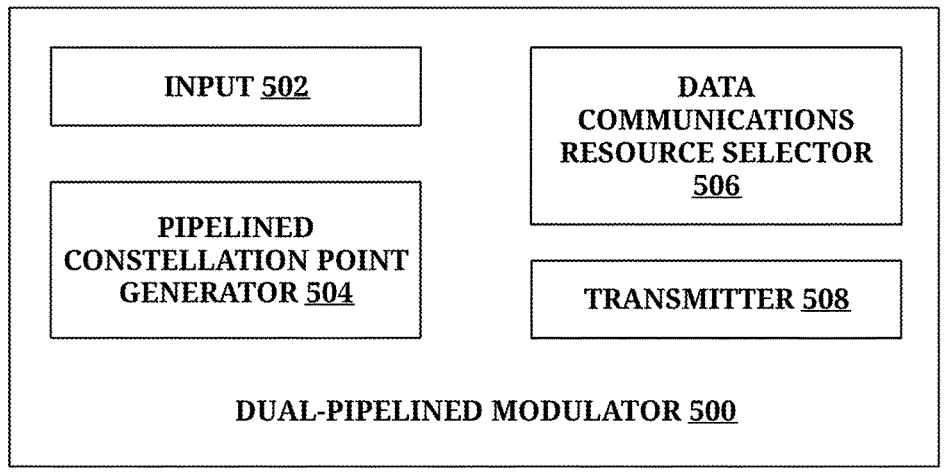
FIG. 5 depicts an exemplary dual-pipelined modulator component diagram, in accordance with at least one embodiment.

FIG. 5 depicts an exemplary dual-pipelined modulator component diagram, in accordance with at least one embodiment. FIG. 5 depicts a dual-pipelined modulator 500 that comprises an input 502, configured to receive a set of bits.

The dual-pipelined modulator 500 further comprises, a pipelined constellation point generator 504, configured to generate complex baseband symbols from the set of bits at least in part by (i) mapping the set of bits to a first symbol using a first constellation mapping and by (ii) mapping the set of bits to a second symbol using a second constellation mapping, dual-pipelined modulator 500 further comprises, a data communication resource selector 506, configured to select a first data communication resource in a first single carrier channel for the first symbol and a second data communication resource in a second single carrier channel for the second symbol, dual-pipelined modulator 500 further comprises a transmitter 508, having a modulator (not depicted), configured to transmit the first and second symbols using the respective selected data communication resources. Of course, any of the embodiments discussed throughout the present disclosure may be applied within the context of the dual-pipelined modulator 500.

Figure 6:
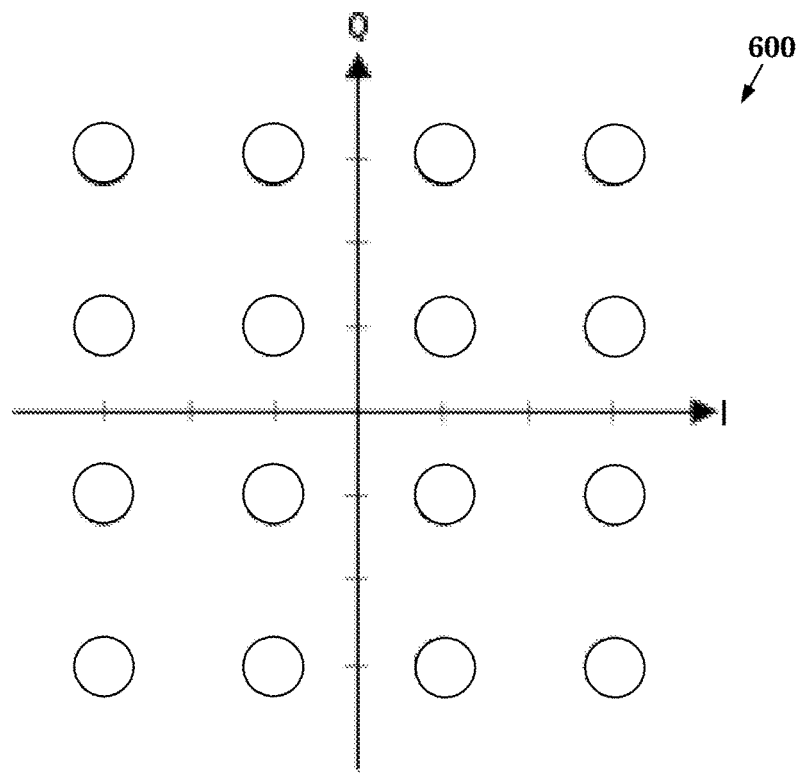
FIG. 6 depicts an exemplary square constellation map, in accordance with at least one embodiment.
Figure 7:
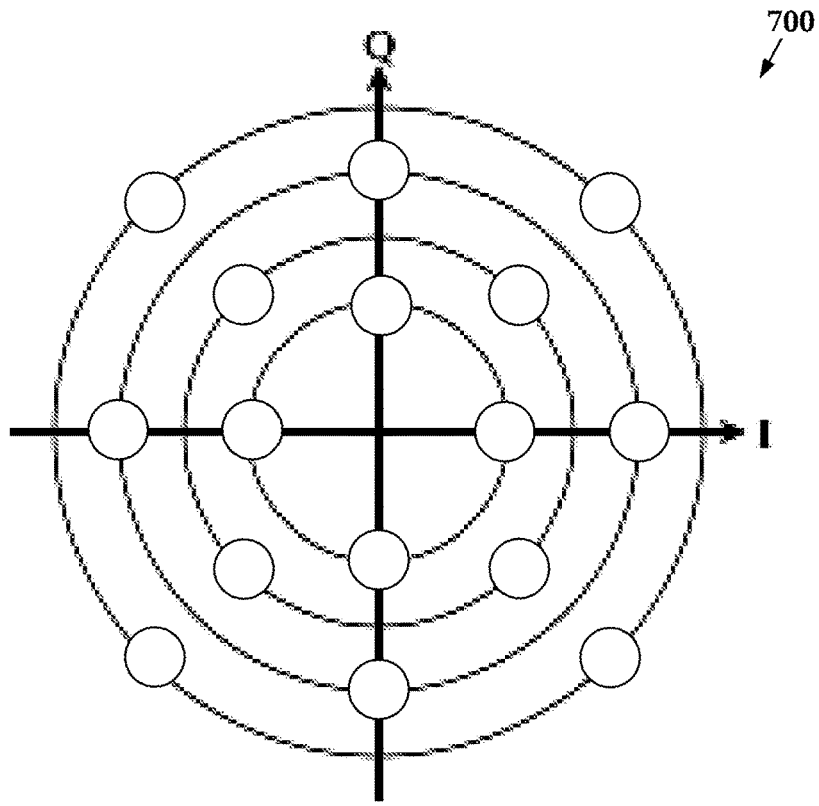
FIG. 7 depicts an exemplary circular constellation map, in accordance with at least one embodiment.
Figure 10:
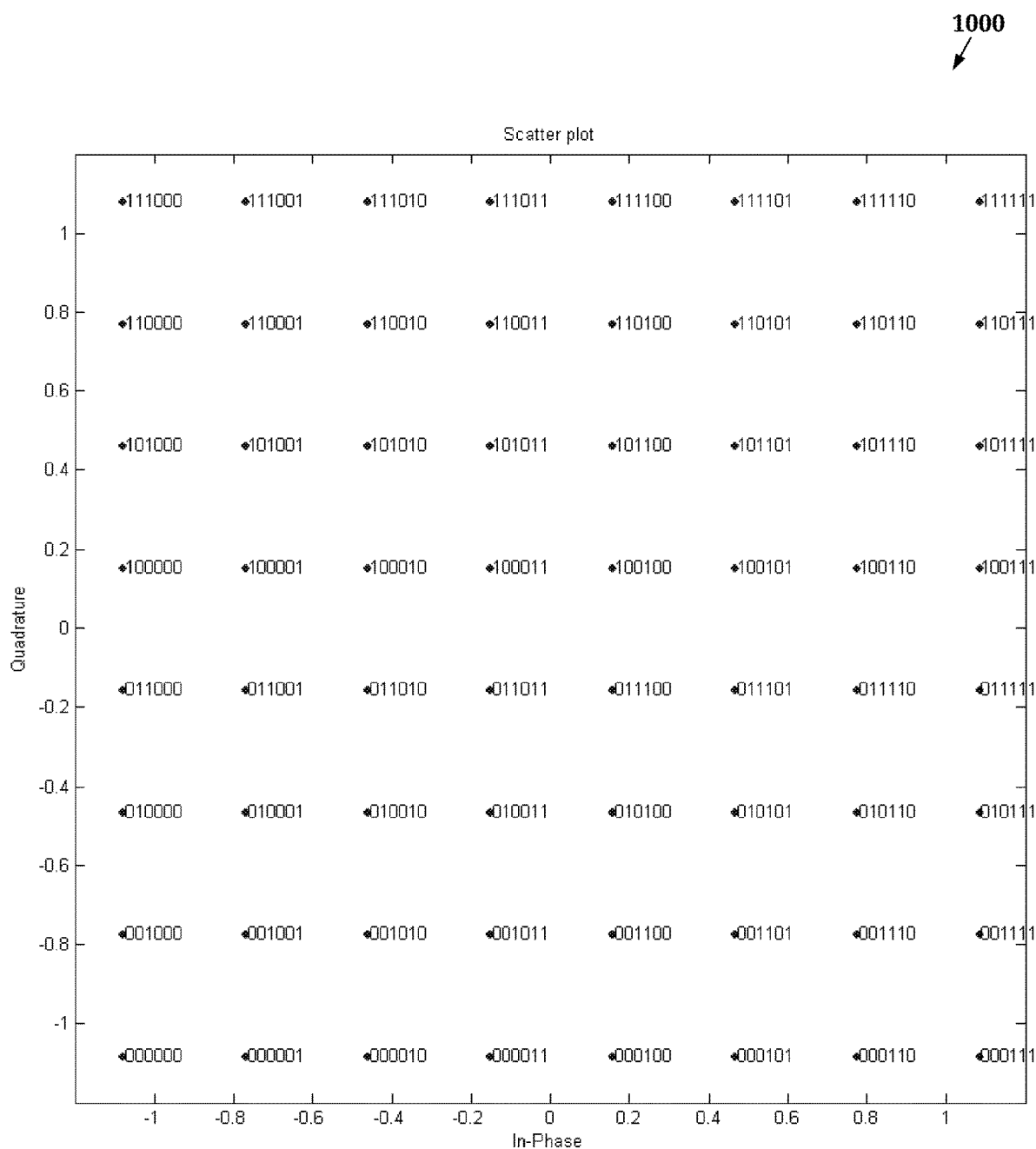
FIG. 10 depicts a first example 64-QAM set-partition mapping, in accordance with at least one embodiment.
Figure 11:
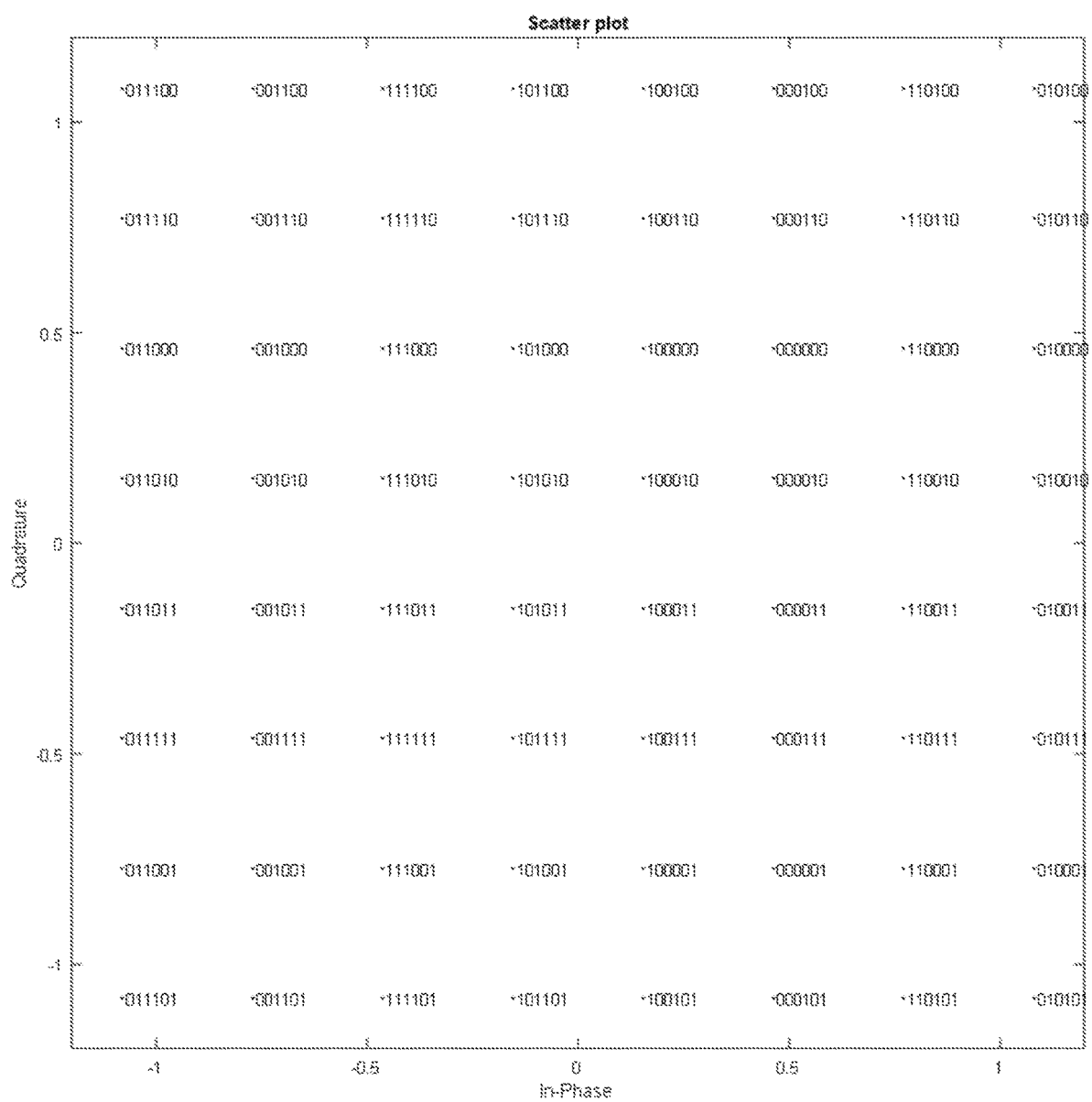
FIG. 11 depicts a second example 64-QAM set-partition mapping that was generated from the first example 64-QAM set-partition mapping of FIG. 10, in accordance with at least one embodiment.

In at least one embodiment, the first constellation mapping and the second constellation mapping each map the set of bits to different constellation signal points. The mappings each map the set of bits to different IQ values. A variety of means may be carried out to map the set of bits to different constellation signal points. In one example, a first constellation is a square constellation and a second constellation is a circular constellation. FIGS. 6 and 7 are provided as references of such. In another example, the constellation shapes are both square, however collocated constellation points map to different binary words. FIGS. 10 and 11 are provided as references of such. Of course, those with skill in the art would be able to list more examples as well, but the listing shall be left as it is for the sake of brevity and in no way by means of limitation.

FIG. 6 depicts a square constellation map, in accordance with at least one embodiment. In particular, FIG. 6 depicts a square constellation map 600 that is provided as an example and a visual reference.

FIG. 7 depicts a circular constellation map, in accordance with at least one embodiment. In particular, FIG. 7 depicts a circular constellation map 700 that is provided as an example and a visual reference.

In order to perform a standard $2^{2n+1}$ modulation, which maps 2n+1 bits to one constellation symbol, systems may use an odd constellation mapping. However, it may suffer from the gray mapping penalty. Instead, the system and process disclosed herein performs two $2^{(2n+1)*2}$ modulations on a set of (2n+1)*2 bits using a higher order even constellation. The modulated symbols may be transmitted in multiple domains, which may include frequency, time, and spatial domains. This is referred to as a dual-pipelined modulation scheme and it may be carried out in response to a BER or a PER associated with an active modulation scheme being used by a transmitter being above a threshold value. The two constellation mappings may or may not be the same. For example, the first constellation mapping may be a Gray code mapping, while the second constellation mapping may be a different Gray code mapping, or a set-partition mapping or any other equally-sized (i.e., mapping the same number of bits) constellation mapping as would be understood by one with skill in the art. A bit-wise function or operation may be applied before one constellation mapping. Alternatively, a symbol level function or operation may be applied after one constellation modulation. A combination of bit-wise and symbol level operations may be applied together. In this way, the modulated symbols may be different even though they are generated from the same set of (2n+1)*2 bits. Optionally, in cases wherein the two modulated symbols do not have the same in-phase (I) and quadrature-phase (Q) component, I/Q component-wise interleaving may be applied to the symbols. For example, the Q (or I) component of the first modulated symbol would become the I (or Q) component of the second modulated symbol after I/Q component-wise interleaving. Then the two modulated interleaved symbols may be sent over two different data communication resources which could be two different time, frequency and/or spatial resources. By doing so, I and Q components of the transmitted symbols may experience independent fading. At a receiver, after I/Q component-wise de-interleaving, the two modulated symbols may be identified by employing maximum likelihood (ML) criterion.

Figure 8:
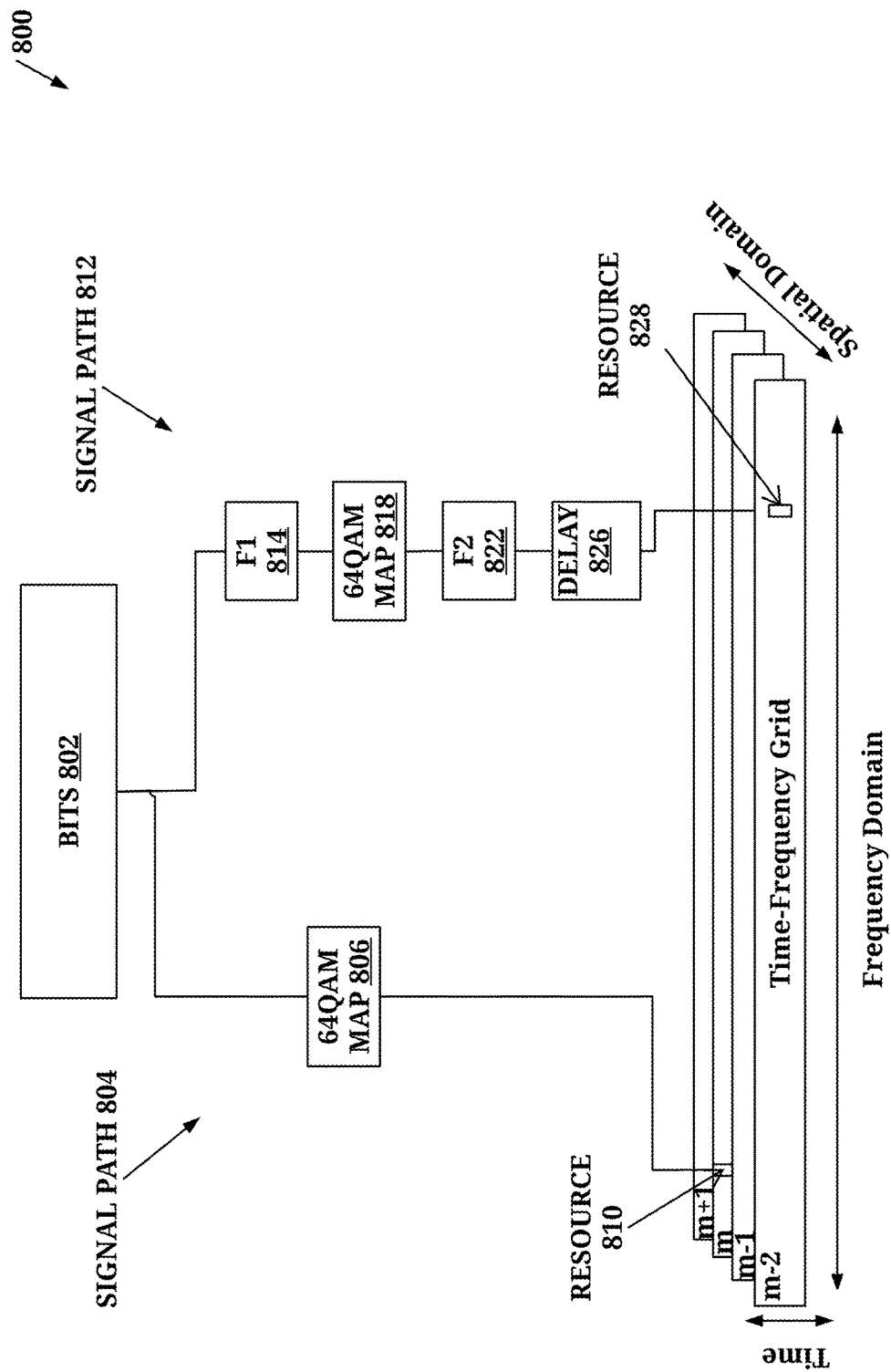
FIG. 8 depicts an exemplary scheme for dual-pipelined modulation of bits onto two symbols, in accordance with at least one embodiment.

FIG. 8 depicts an exemplary scheme for dual-pipelined modulation of bits onto two symbols, in accordance with at least one embodiment. The modulation procedure is given below: Bits 802, comprising (2n+1)*2 bits, take two different signal processing paths, signal path 804 and signal path 812 before being allocated to two different frequency-time-spatial resources 810 and 828. Assume n=1 and therefore (2n+1)*2=6 bits are in to be modulated. In the signal path 804, the set of bits 802 is modulated in a conventional even-ordered modulation scheme at a 64-QAM MAP 806 before being allocated to a frequency subcarrier, k, and a spatial resource unit, m at resource 810.

In the signal path 812, the set of bits 802 is first reordered following a predefined scheme at a function FI 814. The reordered bits 802 are modulated using a conventional even-ordered modulation scheme at a 64-QAM MAP 818. The 64-QAM MAP 818 may be the same as or different than the 64-QAM MAP 806. A modulated symbol from the 64-QAM MAP 818 may then be mapped to a different constellation point in a complex domain by a function F2 822, shown in FIG. 8. The newly mapped symbol from the F2 822 is allocated to the time-frequency-spatial resource 828 based on a predefined function p(τ, k, m) where T is a delay 826 i.e., the time difference between the allocation of the symbol resource in the signal path 804 and the signal path 812.

Figure 9:
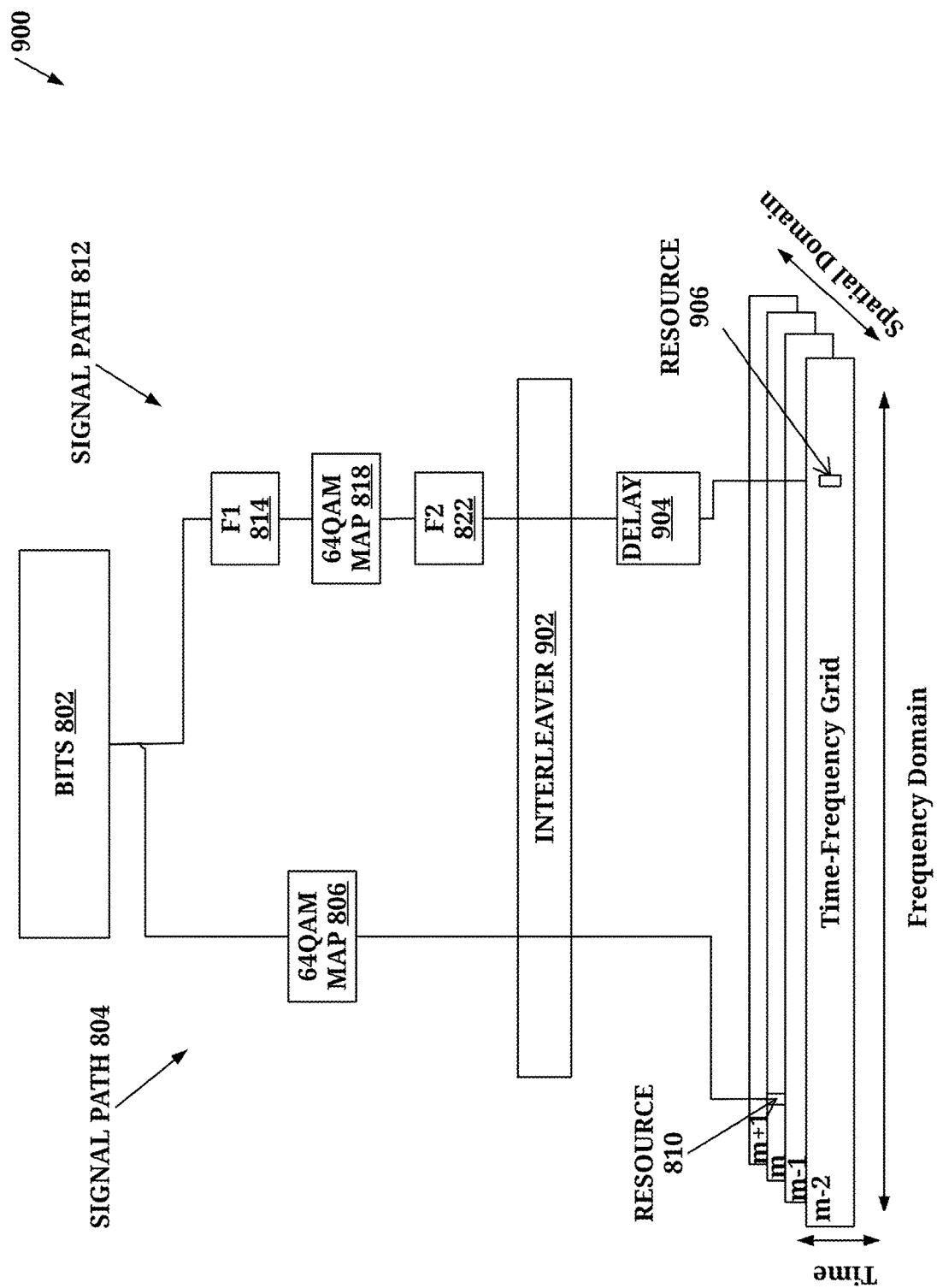
FIG. 9 depicts the modulation scheme of FIG. 8 with component-wise interleaving, in accordance with at least one embodiment.

FIG. 9 depicts the modulation scheme of FIG. 8 with component-wise interleaving, in accordance with at least one embodiment. FIG. 9 shows a scenario 900 in which I/Q component-wise interleaving is applied to the two modulated symbols generated from the signal path 804 and the signal path 812. I/Q component-wise interleaving is shown in FIG. 9 at an interleaver 902. The Q (or I) component of the first modulated symbol in the signal path 804 may become the I (or Q) component of the second modulated symbol in the signal path 812 after I/Q component-wise interleaving at the interleaver 902. The newly mapped second modulated symbol is allocated to a time-frequency-spatial resource 906 based on a predefined function p(τ, k, m) where T is a delay 904 i.e., the time difference between the allocation of the symbol resource in the signal path 804 and the signal path 812.

Note, the described scheme may increase the time/frequency/spatial diversity of the system. Thus, it may be extended to any constellation size and is not restricted to odd constellation mappings. In the above-mentioned schemes, in order to map U=2n+1 bits to one symbol, equivalently, 2U bits may be mapped to two symbols with higher order constellation mappings. This may be generalized to map JU bits to J symbols using 2JU constellations, and the resulting J symbols may be distributed across the time, frequency, and/or spatial domains.

The usage of the dual-pipelined modulation may be one of many modulation modes a transmitter may use, and thus it may be signaled by the transmitter to a receiver. For example, within an 802.11 frame format, a signaling field in a PLCP header may be used to indicate use of the dual-pipelined modulation. The capability to transmit and receive dual-pipelined modulations may also be exchanged between the transmitter and receiver via signaling.

p($\tau$, k, m) is a function to allocate time/frequency/spatial resources to the J modulated symbols. The function may be predefined for a single transmission or specified by a standard. Generally, it is a function of time, frequency and spatial stream. However, it may not require the presentation of each of the three dimensions. For instance:

p($\tau$, k, m)=p(k), which means it is a function of frequency only. For example, with OFDM/OFDMA or OFDM/OFDMAesque multi-carrier waveforms, the frequency index may be a subcarrier index. The function may be carefully designed to gain frequency diversity. For example, one design criteria may be to separate the J symbols by a coherence bandwidth. As another example, with single carrier waveforms, the frequency index may be a center frequency of a communication channel.

p($\tau$, k, m)=p($\tau$), which means it is a function of time only. For example, with OFDM/OFDMA or OFDM/OFDMA like multi-carrier waveform, the time may refer to OFDM/OFDMA symbol index. With single carrier transmissions, the time may refer to a chip index. The function may be based on a delay or processing-time difference between the signal paths. The function may be carefully designed to gain time diversity. For example, one design criteria may be to separate the J symbols by a coherence time.

p($\tau$, k, m)=p(m), which means it is a function of spatial stream only. For example, it may refer to spatial stream index or spatial time stream index.

In alternative embodiments, the function p($\tau$, k, m) may be defined as p($\tau$, k, m), i.e., a combination of the above-mentioned parameters.

FIG. 10 depicts a first example 64-QAM set-partition mapping, in accordance with at least one embodiment. In particular FIG. 10 depicts a first 64-QAM set-partition mapping 1000. With the dual-pipelined modulation scheme disclosed herein, a system can map 6 bits to two symbols, each with a different 64-QAM modulation mapping. Gray code organized constellation points may not be optimal and set-partition distributions may be used for the first and second 64-QAM modulation mappings. An first exemplary set-partition mapping is depicted in FIG. 10.

FIG. 11 depicts a second example 64-QAM set-partition mapping that was generated from the first example 64-QAM set-partition mapping of FIG. 10, in accordance with at least one embodiment. In particular FIG. 11 depicts a second 64-QAM set-partition mapping 1100 that is generated from the mapping 1000. In one example, in the second signal processing path, the system maps the same 6 bits to another 64-QAM constellation point through another mapping. The following procedure may be used to generate the second mapping:

The first mapping $\mathcal{M}_1$ may be represented by an N×N matrix, where each component is a binary sequence, or an integer related to the binary sequence, $\mathcal{M}_1$: {[$b_1$, $b_2$, ..., $b_K$]}→mD+i nD, where K=$\log_2$(N·N), and D is the smallest distance between two constellation points. Thus, a binary sequence may be mapped to the complex symbol located in the m×n grid as shown in FIG. 10. In this example with 64-QAM modulation, N=8, K=6, and we have $\mathcal{M}_1$([1 1 1 0 0 0])=−4D+i 4D) and $\mathcal{M}_1$([1 0 0 1 0 0])=D+i D).

We can define a row/column permutation operation $\wp$: {[1: N]}→{[1: N]}, which maps an integer number n ∈[1, N] to another integer number $\wp$(n) ∈[1, N]. The mapping may be one to one. The second mapping $\mathcal{M}_2$ may be represented by $\mathcal{M}_2$: {[$b_1$, $b_2$, ..., $b_K$]}→$\wp$(m)D+i $\wp$(n)D, where m and n come from the first mapping $\mathcal{M}_1$.

Based on the above-mentioned procedure, a selection of the permutation operation $\wp$ may be of interest. Various mapping schemas may require different permutation operations. In this example, the permutation operation $\wp$=[3 7 4 5 1 8 2 6] is used. The resulting constellation mapping is depicted in FIG. 11 as the mapping 1100.

Figure 12:
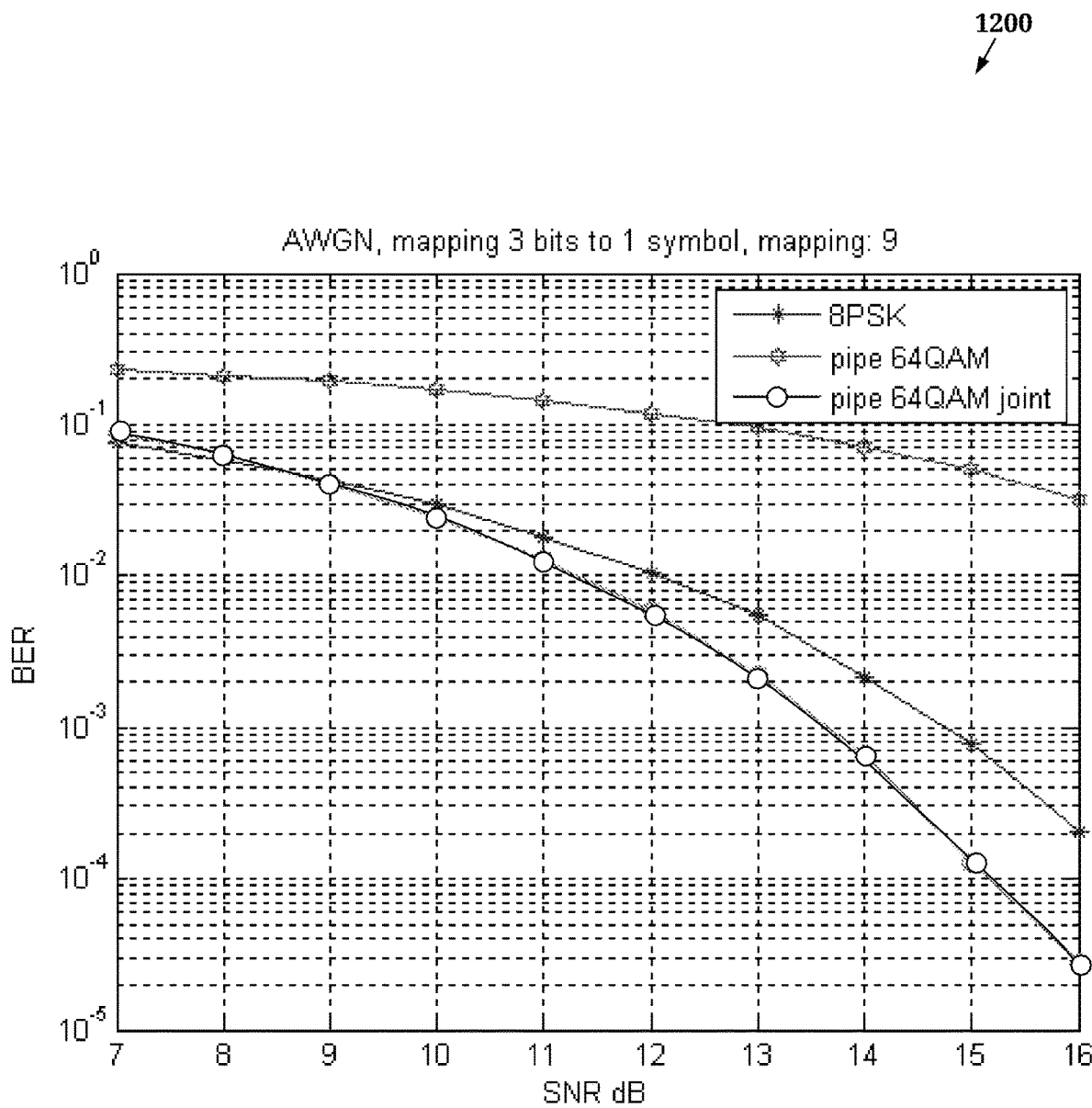
FIG. 12 depicts BER performance results of dual-pipelined modulation on an AWGN channel, in accordance with at least one embodiment.

FIG. 12 depicts BER performance results of the dual-pipelined modulation on an AWGN channel, in accordance with at least one embodiment. FIG. 12 depicts simulation results 1200 on an AWGN channel. A baseline modulation is 8-QSK, which is about 1.5 dB worse than the dual-pipelined modulation method taught herein with joint detection making use of ML criterion.

For reliable transmission and reception of dual-pipelined modulated data, a receiver must have exact knowledge of the data communication resource allocation function. This may be achieved in a plurality of ways.

The usage of dual-pipelined modulation may be signaled by the transmitter. For example, within the 802.11 frame format, the Signaling field in the PLCP header may be used to indicate a mode used by the transmitter. If dual-pipelined modulation is implemented such that the dual-pipelined modulation may be on or off, a binary indicator may signaled by the transmitter. For example, within the 802.11 frame format, the Signaling field in the PLCP header may be used to indicate whether the pipelined modulation was used. In this scheme, a predefined resource allocation function must be used.

For more flexibility, in some embodiments the resource allocation is not predefined, but is instead defined by the function p($\tau$, k, m), p(k), p(t) or p(m). In such a scenario, the function's form must be part of the signaling scheme. Changes in any parameter that will modify the function output must be part of signaling scheme too. This signaling may be a closed loop process or an open loop process.

In an open loop process an AP measures one or more of following during uplink transmission from the STA: Coherence time (using Doppler estimates), Coherence frequency (using channel estimates and frequency selectivity), and Receive antenna correlation (using channel estimates). Based on the measured estimates, parameters for resource mapping are selected. These parameters are transmitted as part of the PLCP header. A field for dual-pipelined modulation enablement and sub-fields for indicating the different parameters may be standardized.

In a closed loop process the AP transmits NDP or Sounding reference symbols. Using the NDP, STA measures one or more of following: Coherence time (using Doppler estimates), Coherence frequency (using channel estimates and frequency selectivity), and Receive antenna correlation (using channel estimates). Based on the measured estimates, parameters for resource mapping are selected. The STA transmits these parameters as part of a feedback report. The feedback report may be part of a control or management frame. The feedback report may be piggybacked onto the data as well.

An STA may request to use dual-pipelined modulation with the parameters it estimated. If the dual-pipelined modulation is already being used in transmission and the STA identifies that another set of parameters may be better, it will report it back to the AP. An STA may request to use dual-pipelined modulation with parameters it estimated. If the STA identifies that in a specific scenario, the AP should not use the dual-pipelined modulation, it will indicate that in the feedback instead. Before initializing the dual-pipeline modulation mode, the capability of transmitting/receiving dual-pipelined modulations can also be exchanged between the transmitter and receiver.

The following portion of this disclosure highlights exemplary means of achieving time, spatial, and frequency division across various selected data communication resources. The dual-pipeline modulation may be applied to SC MIMO and/or SC multi-channel cases.

Bits are partitioned into K-bit sets. Each K-bit set may be mapped to two symbols using two signal paths (i.e., two pipelines). In more detail, the total number of coded bits is N. K is related to the constellation map size or order. If a BPSK modulation, or a scheme that modulates one bit to one symbol, is normally used in conventional conditions, then two QPSK (modulating two bits to one symbol, thus K=2) pipelined modulations could be preferred. If a QPSK modulation, or a scheme which modulates two bits to one symbol is conventional, then two 16-QAM (modulating four bits to one symbol, thus K=4) pipelined modulations could be preferred. If an 8-PSK modulation, or a scheme which modulates three bits to one symbol, is normally used in a conventional scheme, then two 16-QAM (modulating four bits to one symbol, thus K=4) pipelined modulations may be utilized as well. For example, the Nth bit set ($C_{KN}$, $C_{KN+1}$, ..., $C_{KN+K-1}$), using a pipeline modulation scheme with more than two pipes, may be mapped to two symbols, $S_{2N}$, and $S_{2N+1}$, which are constellation points to be transmitted.

Regarding MIMO transmissions, the first symbol generated from the Nth bit set may be allocated to a Uth symbol on a SC block A for a first spatial data stream, while the second symbol generated from the Nth bit set may be allocated to a Vth symbol on a SC block B for a second spatial data stream. Later on, the first symbol generated from the (N+1)th bit set may be allocated to the Uth symbol on the SC block A for the second data stream, while the second symbol generated from the (N+1)th bit set may be allocated to the Vth symbol on the SC block B for the first data stream. Note, we use Nth bit set and (N+1)th bit set as example here, however they may not be adjacent bit sets in some embodiments.

Figure 13:
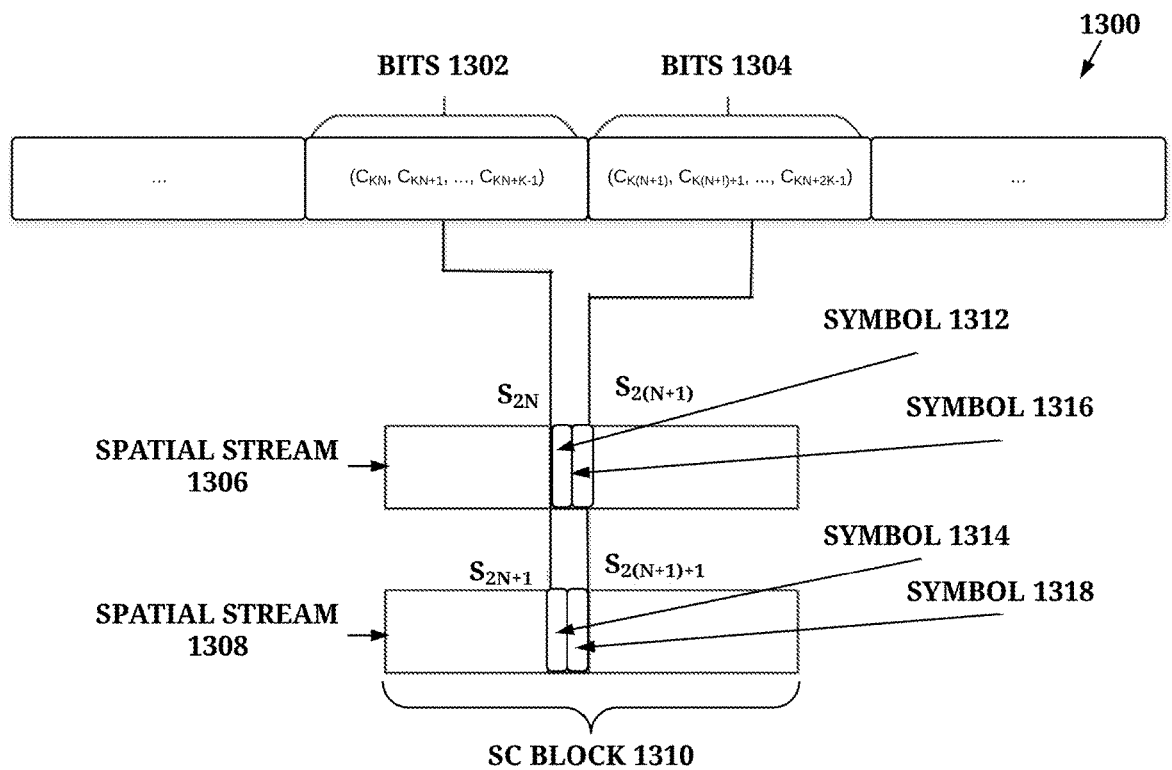
FIG. 13 depicts a visual representation of two MIMO streams without a time offset, in accordance with at least one embodiment.

FIG. 13 depicts a visual representation of two MIMO streams without a time offset, in accordance with at least one embodiment. In FIG. 13 A=B and U=V, thus no time offset is applied between the two MIMO streams. FIG. 13 depicts an overview 1300 that includes two sets of bits 1302 and 1304, two MIMO streams, spatial streams 1306 and 1308, a SC block 1310, and four allocated symbols 1312-1318, wherein symbols 1312 and 1314 are generated via dual-pipelined modulation using bits 1302 and symbols 1316 and 1318 are generated via dual-pipelined modulation using bits 1304. A first complex constellation symbol 1312 generated from bits 1302 is allocated to symbol 1312 in SC block 1310 and spatial stream 1306, while a second complex constellation symbol generated from bits 1302 is allocated to the symbol 1314 in SC block 1310 and spatial stream 1308. The pair of symbols 1316 and 1318 generated from the bits 1304 are allocated within the two spatial streams 1306 and 1308 and in time slots after (or possibly before) the symbols 1312 and 1314.

Figure 14:
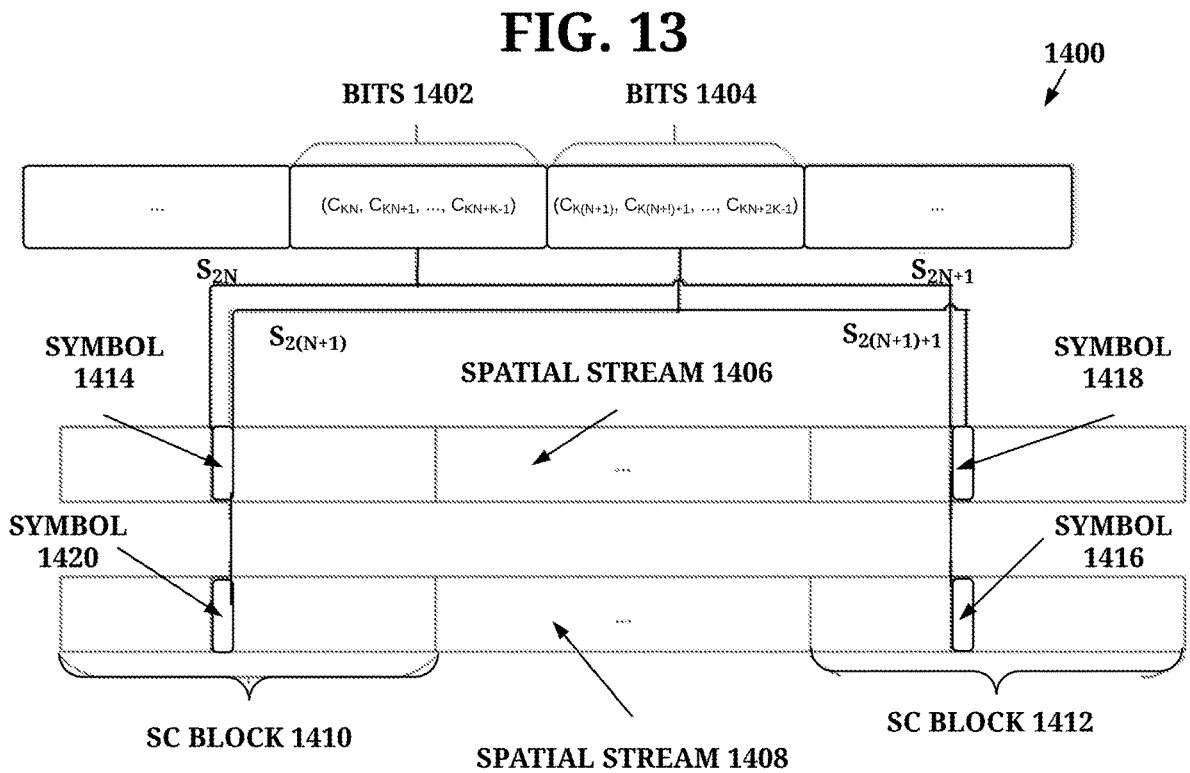
FIG. 14 depicts a visual representation of two MIMO streams with a time offset, in accordance with at least one embodiment.

FIG. 14 depicts a visual representation of two MIMO streams with a time offset, in accordance with at least one embodiment. In FIG. 14 B=A+T_offset and U=V, thus a time offset in units of SC blocks exists between the two channels. FIG. 14 depicts an overview 1400 that includes two sets of bits 1402 and 1404, two MIMO streams, spatial streams 1406 and 1408, SC blocks 1410 and 1412, and four allocated symbols 1414-1420, wherein symbols 1414 and 1416 are generated via dual-pipelined modulation using bits 1402 and symbols 1418 and 1420 are generated via dual-pipelined modulation using bits 1404. A first complex constellation symbol 1414 generated from bits 1402 is allocated to symbol 1414 in SC block 1410 and spatial stream 1406, while a second complex constellation symbol generated from bits 1402 is allocated to the symbol 1416 in SC block B and spatial stream 1408. The symbol 1418 generated from bits 1404 is allocated to SC block 1412 and spatial stream 1406, while the symbol 1420 generated from bits 1404 is allocated to SC block 1410 and spatial stream 1408.

In one example, T_offset may be a small number, e.g., 1. In this way, the adjacent two SC blocks may form a SC block pair. The pair of symbols 1414-1416 may be allocated within the SC block pair over the MIMO streams. In another example, T_offset may be half of the total number of SC blocks used, e.g., T_offset=N_SC_block/2. In the case that N_SC_block is an odd number because T_offset=(N_SC_block+1)/2. In this way, SC blocks 1410 and 1412 may form a SC block pair.

Figure 15:
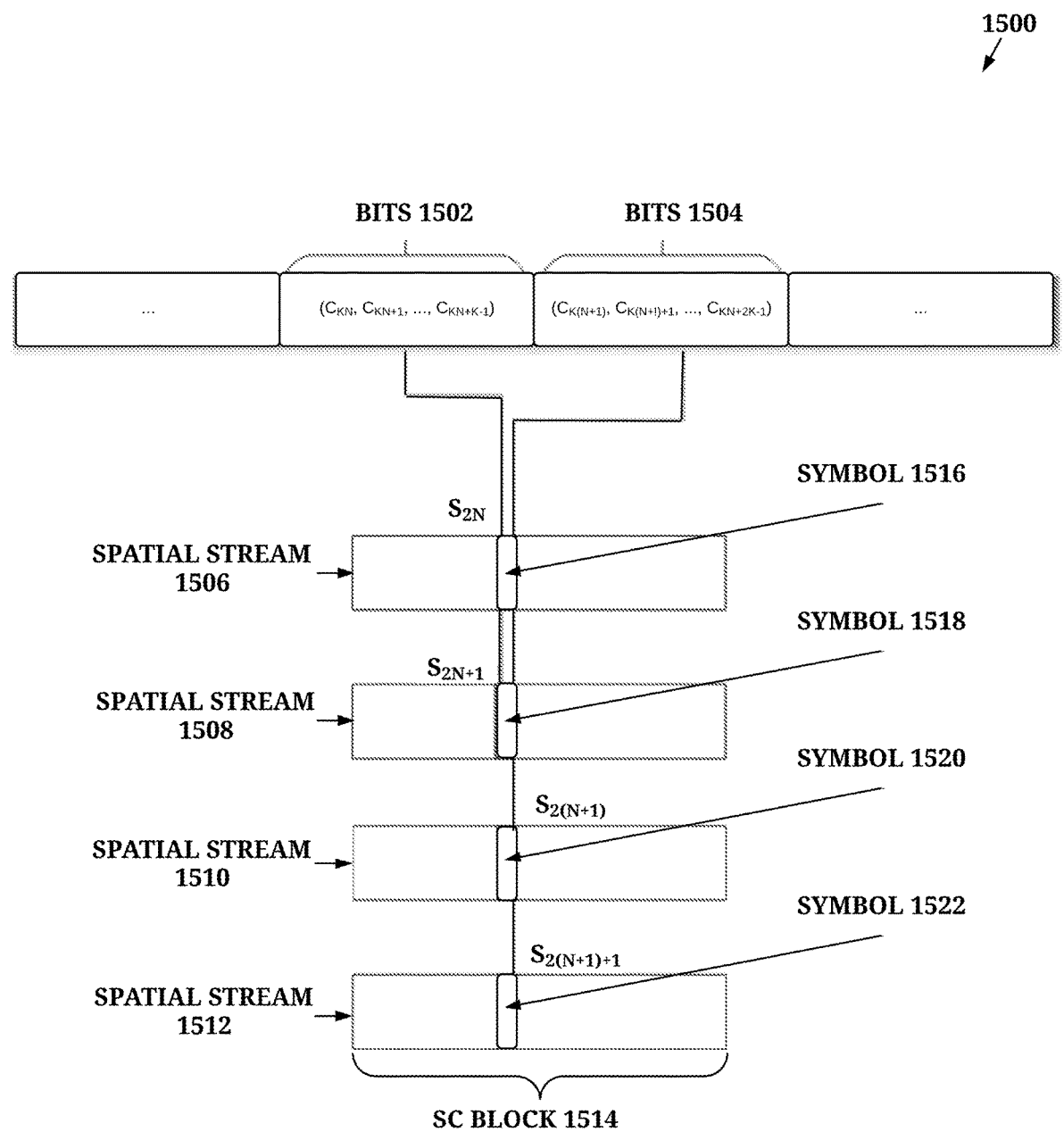
FIG. 15 depicts a visual representation of four MIMO streams without a time offset, in accordance with at least one embodiment.

FIG. 15 depicts a visual representation of four MIMO streams without a time offset, in accordance with at least one embodiment. FIG. 15 depicts an overview 1500 that includes two sets of bits 1502 and 1504, four MIMO streams, spatial streams 1506-1512, a SC block 1514, and four allocated symbols 1516-1522, wherein symbols 1516 and 1518 are generated via dual-pipelined modulation using bits 1502 and symbols 1520 and 1522 are generated via dual-pipelined modulation using bits 1504. A first complex constellation symbol 1516 generated from bits 1502 is allocated to SC block 1514 and spatial stream 1506, while a second complex constellation symbol 1518 generated from bits 1502 is allocated SC block 1514 and spatial stream 1508. The pair of symbols 1520 and 1522 generated from the bits 1504 are allocated within the two spatial streams 1510 and 1512. The scheme may be extended to an 8 stream case and so on. In that case, the (N+2)th bit set and (N+3)th bit set may be used to generate four symbols to be allocated to symbol slots in SC block 1514 for the 4th stream to the 8th stream respectively.

Of course, many other resource allocation examples could be listed as well. Combinations of time diversity, spatial diversity, and frequency diversity help to improve a SNR.

Regarding multi-channel transmissions, including channel bonding/aggregation scenarios, the first symbol generated from the Nth bit set may be allocated to Uth symbol on the SC block A for the first channel, while the second symbol generated from the Nth bit set may be allocated to the Vth symbol on the SC block B for the second channel. Later on, the first symbol generated from the (N+1)th bit set may be allocated to Uth symbol on the SC block A for the second channel, while the second symbol generated from the (N+1)th bit set may be allocated to the Vth symbol on the SC block B for the first channel. Note, uses of the Nth bit set and (N+1)th bit set as example here, they may not be adjacent bit sets in some embodiments. Once again, the FIGS. 13-15 may be used a visual reference to help aid in understanding the various resource allocation possibilities. In particular, multichannel embodiments may be understood as follows: In FIG. 13 A=B and U=V, thus no time offset is applied between the two different channels. In an alternative embodiment, FIG. 13 depicts an overview 1300 that includes two sets of bits 1302 and 1304, two separate channels 1306 and 1308, a SC block 1310, and four allocated symbols 1312-1318, wherein symbols 1312 and 1314 are generated via dual-pipelined modulation using bits 1302 and symbols 1316 and 1318 are generated via dual-pipelined modulation using bits 1304. A first complex constellation symbol 1312 generated from bits 1302 is allocated to symbol 1312 in SC block 1310 and channel 1306, while a second complex constellation symbol generated from bits 1302 is allocated to the symbol 1314 in SC block 1310 and channel 1308. The pair of symbols 1316 and 1318 generated from the bits 1304 are allocated within the two separate channels 1306 and 1308 and in time slots after (or possibly before) the symbols 1312 and 1314.

Similarly, in an alternative embodiment, FIG. 14 depicts a visual representation of two channels with a time offset. In FIG. 14 B=A+T_offset and U=V, thus a time offset in units of SC blocks exists between the two channels. FIG. 14 depicts an overview 1400 that includes two sets of bits 1402 and 1404, two channels 1406 and 1408, SC blocks 1410 and 1412, and four allocated symbols 1414-1420, wherein symbols 1414 and 1416 are generated via dual-pipelined modulation using bits 1402 and symbols 1418 and 1420 are generated via dual-pipelined modulation using bits 1404. A first complex constellation symbol 1414 generated from bits 1402 is allocated to symbol 1414 in SC block 1410 and channel 1406, while a second complex constellation symbol generated from bits 1402 is allocated to the symbol 1416 in SC block B and channel 1408. The symbol 1418 generated from bits 1404 is allocated to SC block 1412 and channel 1406, while the symbol 1420 generated from bits 1406 is allocated to SC block 1410 and channel 1408.

In one example, T_offset may be a small number, e.g., 1. In this way, the adjacent two SC blocks may form a SC block pair. The pair of symbols 1414-1416 may be allocated within the SC block pair over the two channels. In another example, T_offset may be half of the total number of SC blocks used, e.g., T_offset=N_SC_block/2. In the case that N_SC_block is an odd number because T_offset=(N_SC_block+1)/2. In this way, SC blocks 1410 and 1412 may form a SC block pair.

In an alternative embodiment, FIG. 15 depicts a visual representation of four channels without a time offset. FIG. 15 depicts an overview 1500 that includes two sets of bits 1502 and 1504, four channels 1506-1512, a SC block 1514, and four allocated symbols 1516-1522, wherein symbols 1516 and 1518 are generated via dual-pipelined modulation using bits 1502 and symbols 1520 and 1522 are generated via dual-pipelined modulation using bits 1504. A first complex constellation symbol 1516 generated from bits 1502 is allocated to SC block 1514 and channel 1506, while a second complex constellation symbol 1518 generated from bits 1502 is allocated SC block 1514 and channel 1508. The pair of symbols 1520 and 1522 generated from the bits 1504 are allocated within the two channels 1510 and 1512. The scheme may be extended to an 8 channel case and so on. In that case, the (N+2)th bit set and (N+3)th bit set may be used to generate four symbols to be allocated to symbol slots in SC block 1514 for the 4th channel to the 8th channel respectively.

In embodiments that leverage both multi-channel (carrier aggregation/channel bonding) plus multi-stream MIMO, coded bits (or uncoded bits) may be parsed to two streams first. Then for each stream, the dual-pipelined modulation of the present disclosure may be applied and the two symbols coming from the two pipelines are be allocated to different channel or sub-channels. Alternatively, the coded bits (or uncoded bits) may be parsed to two channel segments first. Then they may be modulated using the dual-pipelined modulation described herein. The two symbols coming from the dual-pipelined modulation may be allocated to different spatial streams.

In the above methods, SC block A (e.g., SC blocks 1310, 1410, and 1514) and SC block B (e.g., SC blocks 1412) can be adjacent SC blocks. In 802.11ad, each SC block carries 448 symbols. In 802.11ay, or future systems, other numerologies may be applied. Alternatively, SC block A and SC block B may be separated in time. For example, if total number of $N_{blocks}$ may be transmitted, SC block A and B may be separated by $N_{blocks}/2$, i.e., $B=A+N_{blocks}/2$.

OFDM PHY is not included in the some 802.11 standards due to compatibility issues. Moreover, with the current 802.11ad OFDM PPDU, STF and CEF are single carrier (SC) modulated waveforms while the Header and the Data fields use OFDM waveforms. The two waveforms have different sampling rates which will require up-sampling and filtering for the OFDM waveform as mentioned during the discussion of FIG. 3. Thus, the filter has to be specified at the transmitter side and known at the receiver side so that the receiver can compensate the channel estimation result obtained based on SC CEF and apply it to the Header/Data fields. Due to at least the abovementioned complications, the OFDM PPDU format is amenable to be redesigned. Methods and procedures are disclosed in the following paragraphs for addressing at least this problem.

Figure 16:
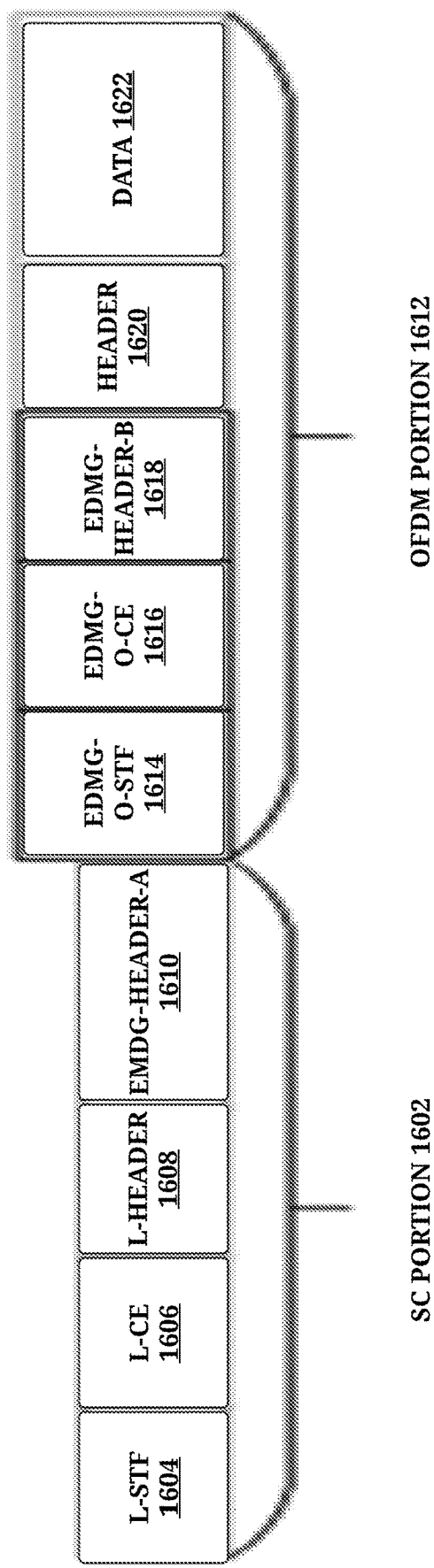
FIG. 16 depicts an exemplary new EDMG OFDM PPDU, in accordance with at least one embodiment.

FIG. 16 depicts an exemplary new EDMG OFDM PPDU, in accordance with at least one embodiment. In one embodiment, an exemplary new EDMG OFDM PPDU includes a SC portion 1602 and an OFDM portion 1604, as depicted in FIG. 16.

The SC portion 1602, which may be composed of, but is not limited to, legacy STF (L-STF 1604), legacy CE field (L-CE 1606) and legacy Header (L-Header 1608), and an EDMG Header A 1610, is modulated using SC modulation.

The OFDM portion 1612 which may be composed of, but is not limited to, EDMG STF for OFDM (EDMG-O-STF 1614), EDMG CEF for OFDM (EDMG-O-CE 1616), EDMA Header B (EDMG Header-B 1618), a Header 1620 and a Data 1622, is modulated using OFDM. The L-Header or EDMG-Header-A has a signal to indicate if the current PPDU is OFDM or SC, as well as the duration of the rest of the PPDU.

Note that in this design, the OFDM portion 1612 has its own CEF transmitted with the OFDM waveform, and the receiver does not need to use the channel estimation from the legacy SC portion 1602.

Control PHY is defined in 802.11ad as the lowest data rate transmission. Frames which have to be transmitted before beamforming training may use the Control PHY PPDU. Thus, the improvement of the reliability of Control PHY transmissions, especially in low SNR regimes, is valuable. Methods and procedures are disclosed in this next section to address at least this concern.

Figure 17:
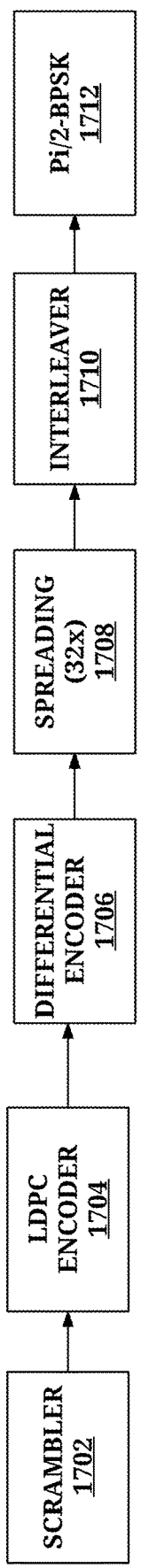
FIG. 17 depicts an exemplary embodiment of a transmission block diagram for Control PHY, in accordance with the present disclosure.

FIG. 17 illustrates an exemplary transmission block diagram for Control PHY, in accordance with at least one embodiment. FIG. 17 depicts a transmission block diagram 1700 that includes a scrambler 1702, an LDPC encoder 1704, a differential encoder 1706, spreading 1708, an interleaver 1710, and a Pi/2-BPSK 1712. In such an embodiment, the interleaver 1710 is used after 32× spreading 1708 but before Pi/2-BPSK 1712 modulation. At least one purpose of the interleaver 1710 is to further distribute spread bits, and thus good bits can help to compensate for bursty errors.

Figure 18:
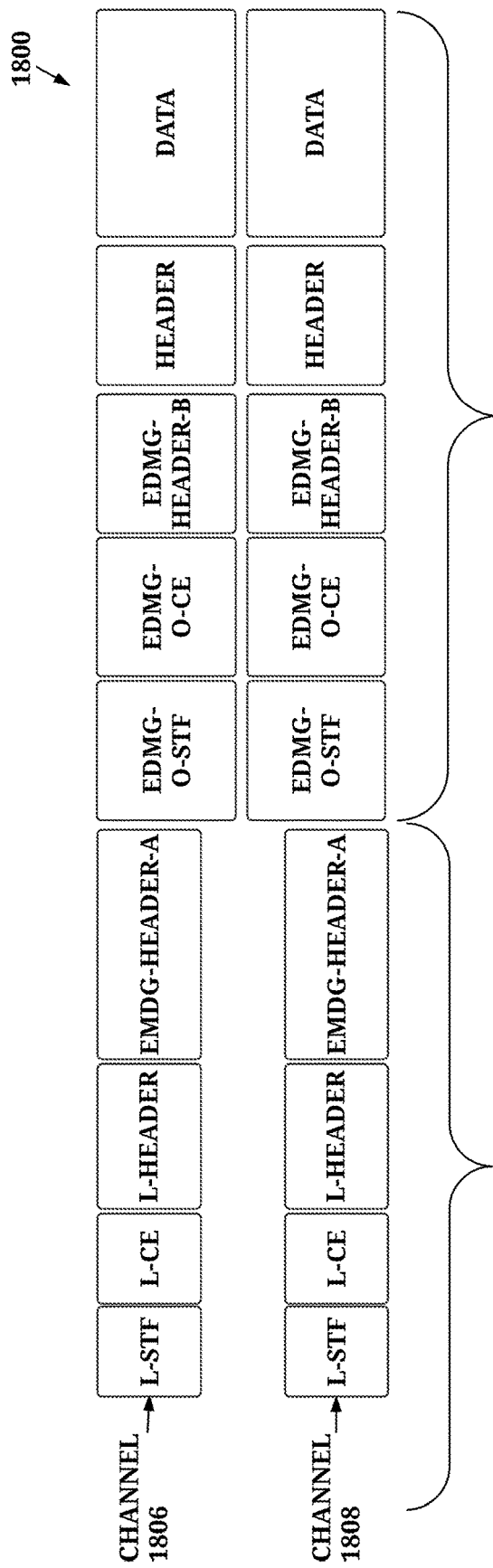
FIGS. 18-19 depicts exemplary embodiments of EDMG OFDM PPDUs with channel bonding/aggregation and MIMO, in accordance with at least one embodiment.

FIG. 18 depicts PPDU structures that can support SU/MU MIMO, in accordance with at least one embodiment. In particular FIG. 18 depicts a PPDU structure 1800 having a SC portion 1802 and an OFDM portion 1804. The PPDU structure 1800 comprises two channels, channels 1806 and 1808.

Figure 19:
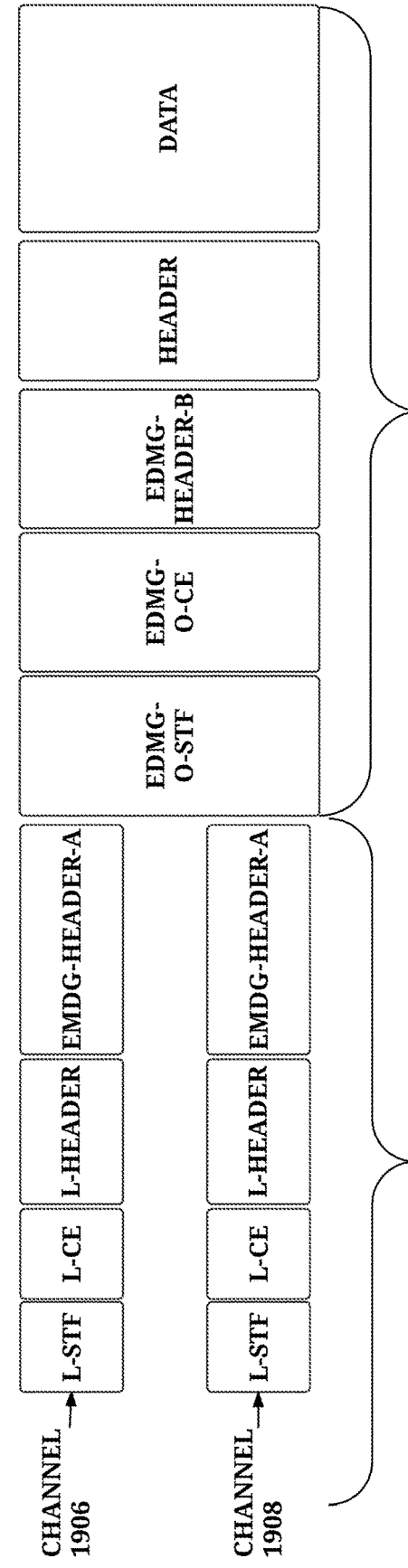

FIS. 19 depicts PPDU structures that can support channel bonding or channel aggregation, in accordance with at least one embodiment. In particular FIG. 19 depicts a PPDU structure 1900 having a SC portion 1902 and an OFDM portion 1904. The PPDU structure 1900 comprises two channels, channels 1906 and 1908. The OFDM portion 1904 is an aggregated portion shared by both the channel 1906 and the channel 1908.

Although the features and elements of the present invention are described in the preferred embodiments in particular combinations, each feature or element can be used alone without the other features and elements of the preferred embodiments or in various combinations with or without other features and elements of the present invention.

Although the solutions described herein consider 802.11 specific protocols, it is understood that the solutions described herein are not restricted to this scenario and are applicable to other wireless systems as well.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Accordingly, some embodiments of the present disclosure, or portions thereof, may combine one or more processing devices with one or more software components (e.g., program code, firmware, resident software, micro-code, etc.) stored in a tangible computer-readable memory device, which in combination from a specifically configured apparatus that performs the functions as described herein. These combinations that form specially programmed devices may be generally referred to herein "modules". The software component portions of the modules may be written in any computer language and may be a portion of a monolithic code base, or may be developed in more discrete code portions such as is typical in object-oriented computer languages. In addition, the modules may be distributed across a plurality of computer platforms, servers, terminals, and the like. A given module may even be implemented such that separate processor devices and/or computing hardware platforms perform the described functions.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be understood that various features are grouped together in various embodiments with the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A method implemented by a wireless transmit/receive unit (WTRU) for transmission of symbols using aggregated channels, the method comprising:
   receiving, at the WTRU, a set of bits;
   partitioning the set of bits into a plurality of partitioned bit sets;
   generating first and second sets of complex-valued symbols based on the partitioned bit sets using dual modulation at least in part by (i) mapping the partitioned bit sets to a first symbol set using a first constellation mapping associated with a first constellation and (ii) mapping the partitioned bit sets to a second symbol set using a second constellation mapping associated with a second constellation, wherein the first constellation mapping and the second constellation mapping each map a respective partitioned bit set to different constellation signal points and the second constellation mapping is representative of a mapping which is associated with a rotated first constellation; and
   and transmitting, by the WTRU using the selected aggregated channels, (1) a first transmission of the first symbol set associated with a first partitioned bit set using a first single carrier (SC) channel in the aggregated channels and (2) a second transmission of the second symbol set associated with the first partitioned bit set using a second SC channel in the aggregated channels,
   wherein:
   the first transmission of the first symbol set associated with the first partitioned bit set and the second transmission of the second symbol set associated with the first partitioned bit set are spatially and temporally offset from each other, and
   the first transmission associated with the first SC channel and the second transmission associated with the second SC channel are indexed using a single, common index, and
   the first SC channel carries a first spatial stream of a multiple-input multiple-output (MIMO) transmission and the second SC channel carries a second spatial stream of the MIMO transmission.

2. The method of claim 1, wherein the second SC channel is temporally offset from the first SC channel.

3. The method of claim 1, wherein the first constellation mapping and the second constellation mapping are selected such that adjacent constellations point pairs in the first mapping are non-adjacent in the second mapping.

4. The method of claim 1, wherein the generating of the first and second sets of complex-valued symbols using the dual modulation further comprises, performing any one of: (i) a bit-wise operation to the respective partitioned bit set prior to the mapping of the respective partitioned bit set to a corresponding symbol of the second symbol set; or (ii) a symbol-wise operation performed on the first symbol set to obtain the second symbol set.

5. The method of claim 4, wherein the symbol wise operation is time-varying.

6. The method of claim 1, wherein the mapping of the partitioned bit sets to the second symbol set using the second constellation mapping comprises at least modifying IQ values of a corresponding symbol of the first symbol set to generate a corresponding symbol of the second symbol set.

7. The method of claim 1, wherein at least one of the first constellation mapping and the second constellation mapping is a square 64-QAM constellation mapping.

8. The method of claim 1, comprising indicating the use of the dual modulation in a signaling field of a Physical Layer Convergence Procedure (PLCP) header.

9. The method of claim 1, further comprising interleaving the first symbol set and the second symbol set prior to the use of the first and second SC channels.

10. The method of claim 1, wherein the mapping to the first symbol set and the mapping to the second symbol set, each use all of the bits in the respective partitioned bit set.

11. A wireless transmit/receive unit (WTRU) configured to transmit symbols using aggregated channels, the WTRU comprising:
   circuitry, including any of a processor, a transmitter and a receiver, the circuitry configured to:
   receive a set of bits;
   partition the set of bits into a plurality of partitioned bit sets; and
   generate first and second sets of complex-valued symbols based on the partitioned bit sets using dual modulation at least in part by (i) mapping the set of bits to a first symbol set using a first constellation mapping associated with a first constellation and by (ii) mapping the partitioned bit sets to a second symbol set using a second constellation mapping associated with a second constellation, wherein the first constellation mapping and the second constellation mapping each map a respective partitioned bit set to different constellation signal points and the second constellation mapping is representative of a mapping which is associated with a rotated first constellation; and
   transmitter circuitry configured to transmit, using the selected aggregated channels, (1) a first transmission of the first symbol set associated with a first partitioned bit set using a first single carrier (SC) channel in the aggregated channels and (2) a second transmission of the second symbol set associated with the first partitioned bit set using a second SC channel in the aggregated channels,
   wherein:
   the first transmission of the first symbol set associated with the first partitioned bit set and the second transmission of the second symbol set associated with the first partitioned bit set are spatially and temporally offset from each other, the first transmission associated with the first SC channel and the second transmission associated with the second SC channel are indexed using a single, common index, and the first SC channel carries a first spatial stream of a multiple-input multiple-output (MIMO) transmission and the second SC channel carries a second spatial stream of the MIMO transmission.

12. The WTRU of claim 11, wherein the second SC channel is temporally offset from the first SC channel.

13. The WTRU of claim 11, wherein the processor is configured to perform at least one of (i) a bit-wise operation to the respective partitioned bit set prior to the mapping of the respective partitioned bit set to a corresponding symbol of the second symbol set or (ii) a time-varying symbol-wise operation performed on the first symbol set to obtain the second symbol set.

14. The WTRU of claim 11, wherein the processor is configured to any of: (1) at least modify IQ values of a corresponding symbol of the first symbol set to generate a corresponding symbol of the second symbol set; or (2) interleave the first symbol set and the second symbol set prior to use of the first and second SC channels.

15. The WTRU of claim 11, wherein any of: the first constellation mapping or the second constellation mapping is a square 64-QAM constellation mapping.

16. The WTRU of claim 11, wherein the processor is configured to map to the first symbol set all of the bits in the respective partitioned bit set and to map to the second symbol set all of the bits in the respective partitioned bit set.

* * * * *